US 012512755B2

(12) United States Patent
Zheng et al.

(10) Patent No.: US 12,512,755 B2
(45) Date of Patent: Dec. 30, 2025

(54) MULTIPORT CHARGING SYSTEMS WITH MULTIPLE DC-TO-DC CONVERTERS CONFIGURED TO GENERATE CURRENTS FLOWING BETWEEN DC-TO-DC CONVERTERS

(71) Applicant: ON-BRIGHT ELECTRONICS (SHANGHAI) CO., LTD., Shanghai (CN)

(72) Inventors: Guangwen Zheng, Shanghai (CN); Wenjiang Wang, Shanghai (CN); Zhiqin Zhao, Shanghai (CN); Qiang Luo, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 210 days.

(21) Appl. No.: 18/529,970

(22) Filed: Dec. 5, 2023

(65) Prior Publication Data

US 2025/0183798 A1 Jun. 5, 2025

(30) Foreign Application Priority Data

Oct. 21, 2022 (CN) .......................... 202211297417.X

(51) Int. Cl.
*H02M 3/156* (2006.01)
*H02J 1/10* (2006.01)
*H02M 1/00* (2006.01)

(52) U.S. Cl.
CPC ............. *H02M 3/156* (2013.01); *H02J 1/102* (2013.01); *H02M 1/0009* (2021.05)

(58) Field of Classification Search
CPC .... H02M 3/1582; H02M 3/156; H02M 3/157; H02M 3/158; H02M 3/1584;
(Continued)

(56) References Cited

U.S. PATENT DOCUMENTS 8,368,252 B2 * 2/2013 Pabon .................. H02M 7/219
307/31
9,735,678 B2 8/2017 Childs
(Continued)

FOREIGN PATENT DOCUMENTS

| CN | 103475086 A | 12/2013 |
|---|---|---|
| CN | 105141155 A | 12/2015 |

(Continued)

OTHER PUBLICATIONS

Taiwan Intellectual Property Office, Office Action issued Jul. 5, 2023, in Application No. 112100609.

*Primary Examiner* — Jeffrey A Gblende
(74) *Attorney, Agent, or Firm* — Faegre Drinker Biddle & Reath LLP

(57) ABSTRACT

DC-to-DC converter for multiport charging system and method thereof. For example, a DC-to-DC converter for a multiport charging system, the multiport charging system including a plurality of output ports that correspond to a plurality of DC-to-DC converters respectively, the plurality of DC-to-DC converters including the DC-to-DC converter, the plurality of output ports including a first output port that corresponds to the DC-to-DC converter, the DC-to-DC converter including: a load detector configured to: detect whether the first output port that corresponds to the DC-to-DC converter is connected to any load; and among the plurality of output ports, determine a first number of one or more output ports that are connected to one or more loads respectively; and a generator configured to: if the first output port that corresponds to the DC-to-DC converter is connected to a load, generate a first voltage as an output voltage for the first output port.

52 Claims, 4 Drawing Sheets

(58) Field of Classification Search
CPC .............. H02M 3/1586; H02M 3/285; H02M 3/33561; H02M 7/49; H02M 1/045; H02M 7/006; H02M 7/06; H02M 7/068; H02M 7/153; H02M 7/10; H02M 1/083; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 1/007; H02M 1/0009; H02M 1/0095; H02M 1/08; H02M 1/088; H02M 3/1588; H02M 7/5395; H02M 1/14; H02M 1/0043; H02M 1/0074; H02M 1/0077; H02M 1/0045; H02M 1/0006; H02J 3/46; H02J 3/38

See application file for complete search history.

(56) References Cited

U.S. PATENT DOCUMENTS

| | | | |
|---|---|---|---|
| 9,774,186 B2 * | 9/2017 | Anderson | H02J 1/14 |
| 2009/0015064 A1 * | 1/2009 | Huang | H02H 7/268 |
| | | | 307/29 |
| 2015/0054451 A1 * | 2/2015 | Rokusek | H02M 7/23 |
| | | | 320/108 |
| 2016/0181814 A1 * | 6/2016 | Huang | H02J 4/00 |
| | | | 307/24 |

FOREIGN PATENT DOCUMENTS

| | | |
|---|---|---|
| CN | 105763033 A | 7/2016 |
| CN | 107659150 A | 2/2018 |
| CN | 109802563 A | 5/2019 |
| CN | 112072925 A | 12/2020 |
| JP | 2017-011870 A | 1/2017 |
| TW | 201503564 A | 1/2015 |

* cited by examiner

MULTIPORT CHARGING SYSTEMS WITH MULTIPLE DC-TO-DC CONVERTERS CONFIGURED TO GENERATE CURRENTS FLOWING BETWEEN DC-TO-DC CONVERTERS

1. CROSS-REFERENCES TO RELATED APPLICATIONS

This application claims priority to Chinese Patent Application No. 202211297417.X, filed on Oct. 21, 2022, incorporated by reference herein for all purposes.

2. FIELD OF THE DISCLOSURE

Certain embodiments of the present disclosure are directed to circuits. More particularly, some embodiments of the disclosure provide multiport charging systems with multiple DC-to-DC converters. Merely by way of example, some embodiments of the disclosure have been applied to USB output ports. But it would be recognized that the disclosure has a much broader range of applicability.

3. BACKGROUND OF THE DISCLOSURE

Multiport charging systems have been widely used in consumer electronics. Conventional multiport charging systems often are implemented as multi-output switching regulators, which usually include one AC-to-DC switching regulator and multiple DC-to-DC switching regulators. Each regulator of the multiple DC-to-DC switching regulators is connected to the AC-to-DC switching regulator. Often, the maximum output power of each regulator of the multiple DC-to-DC switching regulators is equal to the maximum output power of the AC-to-DC switching regulator, so the sum of the maximum output powers of the multiple DC-to-DC switching regulators are equal to the maximum output power of the AC-to-DC switching regulator multiplied by the number of DC-to-DC switching regulators. Such conventional design of multiport charging systems (e.g., multi-output switching regulators) usually suffers from significant redundancy in power capacity and also suffers from substantial extra costs.

Hence it is highly desirable to improve the technique for multiport charging systems.

4. BRIEF SUMMARY OF THE DISCLOSURE

Certain embodiments of the present disclosure are directed to circuits. More particularly, some embodiments of the disclosure provide multiport charging systems with multiple DC-to-DC converters. Merely by way of example, some embodiments of the disclosure have been applied to USB output ports. But it would be recognized that the disclosure has a much broader range of applicability.

According to some embodiments, a DC-to-DC converter for a multiport charging system, the multiport charging system including a plurality of output ports that correspond to a plurality of DC-to-DC converters respectively, the plurality of DC-to-DC converters including the DC-to-DC converter, the plurality of output ports including a first output port that corresponds to the DC-to-DC converter, the DC-to-DC converter including: a load detector configured to: detect whether the first output port that corresponds to the DC-to-DC converter is connected to any load; and among the plurality of output ports, determine a first number of one or more output ports that are connected to one or more loads respectively; and a generator configured to: if the first output port that corresponds to the DC-to-DC converter is connected to a load, generate a first voltage as an output voltage for the first output port, the output voltage being equal to the first voltage; and if the first output port that corresponds to the DC-to-DC converter is not connected to any load and, among the plurality of output ports, only a second output port is connected to a load, generate a contributing current for only the second output port.

According to certain embodiments, a multiport charging system includes: an AC-to-DC converter configured to receive an input voltage and generate a converter voltage based at least in part on the input voltage; a plurality of DC-to-DC converters including a first DC-to-DC converter and a second DC-to-DC converter and configured to receive the converter voltage; a plurality of output ports that correspond to the plurality of DC-to-DC converters respectively, the plurality of output ports including a first output port that corresponds to the first DC-to-DC converter and further including a second output port that corresponds to the second DC-to-DC converter; and a resistor connected to each converter of the plurality of DC-to-DC converters; wherein the first DC-to-DC converter includes: a load detector configured to: detect whether the first output port that corresponds to the first DC-to-DC converter is connected to any load; and among the plurality of output ports, determine a first number of one or more output ports that are connected to one or more loads respectively; and a generator configured to: if the first output port that corresponds to the first DC-to-DC converter is connected to a load, generate a first voltage as an output voltage for the first output port, the output voltage being equal to the first voltage; and if the first output port that corresponds to the first DC-to-DC converter is not connected to any load and, among the plurality of output ports, only the second output port is connected to a load, generate a contributing current for only the second output port.

According to some embodiments, a method for a DC-to-DC converter of a multiport charging system, the multiport charging system including a plurality of output ports that correspond to a plurality of DC-to-DC converters respectively, the plurality of DC-to-DC converters including the DC-to-DC converter, the plurality of output ports including a first output port that corresponds to the DC-to-DC converter, the method including: detecting whether the first output port that corresponds to the DC-to-DC converter is connected to any load; determining, among the plurality of output ports, a first number of one or more output ports that are connected to one or more loads respectively; generating a first voltage as an output voltage for the first output port if the first output port that corresponds to the DC-to-DC converter is connected to a load, the output voltage being equal to the first voltage; and generating a contributing current for only a second output port if the first output port that corresponds to the DC-to-DC converter is not connected to any load and, among the plurality of output ports, only the second output port is connected to a load.

According to certain embodiments, a method for a multiport charging system includes: receiving an input voltage; generating a converter voltage based at least in part on the input voltage; receiving the converter voltage by a plurality of DC-to-DC converters including a first DC-to-DC converter and a second DC-to-DC converter, the plurality of DC-to-DC converters corresponding to a plurality of output ports respectively, the plurality of output ports including a first output port that corresponds to the first DC-to-DC converter and further including a second output port that corresponds to the second DC-to-DC converter; detecting whether the first output port that corresponds to the first DC-to-DC converter is connected to any load; determining, among the plurality of output ports, a first number of one or more output ports that are connected to one or more loads respectively; generating a first voltage as an output voltage for the first output port if the first output port that corresponds to the first DC-to-DC converter is connected to a load, the output voltage being equal to the first voltage; and generating a contributing current for only the second output port if the first output port that corresponds to the DC-to-DC converter is not connected to any load and, among the plurality of output ports, only the second output port is connected to a load.

Depending upon embodiment, one or more benefits may be achieved. These benefits and various additional objects, features and advantages of the present disclosure can be fully appreciated with reference to the detailed description and accompanying drawings that follow.

5. BRIEF DESCRIPTION OF THE DRAWINGS

6. DETAILED DESCRIPTION OF THE DISCLOSURE

Certain embodiments of the present disclosure are directed to circuits. More particularly, some embodiments of the disclosure provide multiport charging systems with multiple DC-to-DC converters. Merely by way of example, some embodiments of the disclosure have been applied to USB output ports. But it would be recognized that the disclosure has a much broader range of applicability.

According to some embodiments, in order to reduce redundancy in power capacity and also lower costs of the multi-output switching regulator, the sum of the maximum output powers of the multiple DC-to-DC switching regulators are changed to become equal to the maximum output power of the AC-to-DC switching regulator. For example, this modification can effectively reduce the maximum output power of each regulator of the multiple DC-to-DC switching regulators if the maximum output power of the AC-to-DC switching regulator remains the same. As an example, this modification can also effectively reduce the maximum total output power of the multi-output switching regulator if only one output of the multi-output switching regulator is connected to a load (e.g., a mobile electronic device).

According to certain embodiments, it is desirable to make the maximum total output power of the multi-output switching regulator equal to the maximum output power of the AC-to-DC switching regulator when only one output of the multi-output switching regulator is connected to a load (e.g., a mobile electronic device). According to some embodiments, it is desirable to make the maximum total output power of the multi-output switching regulator equal to the maximum output power of the AC-to-DC switching regulator when more than one output of the multi-output switching regulator are connected to more than one load respectively.

Figure 1:
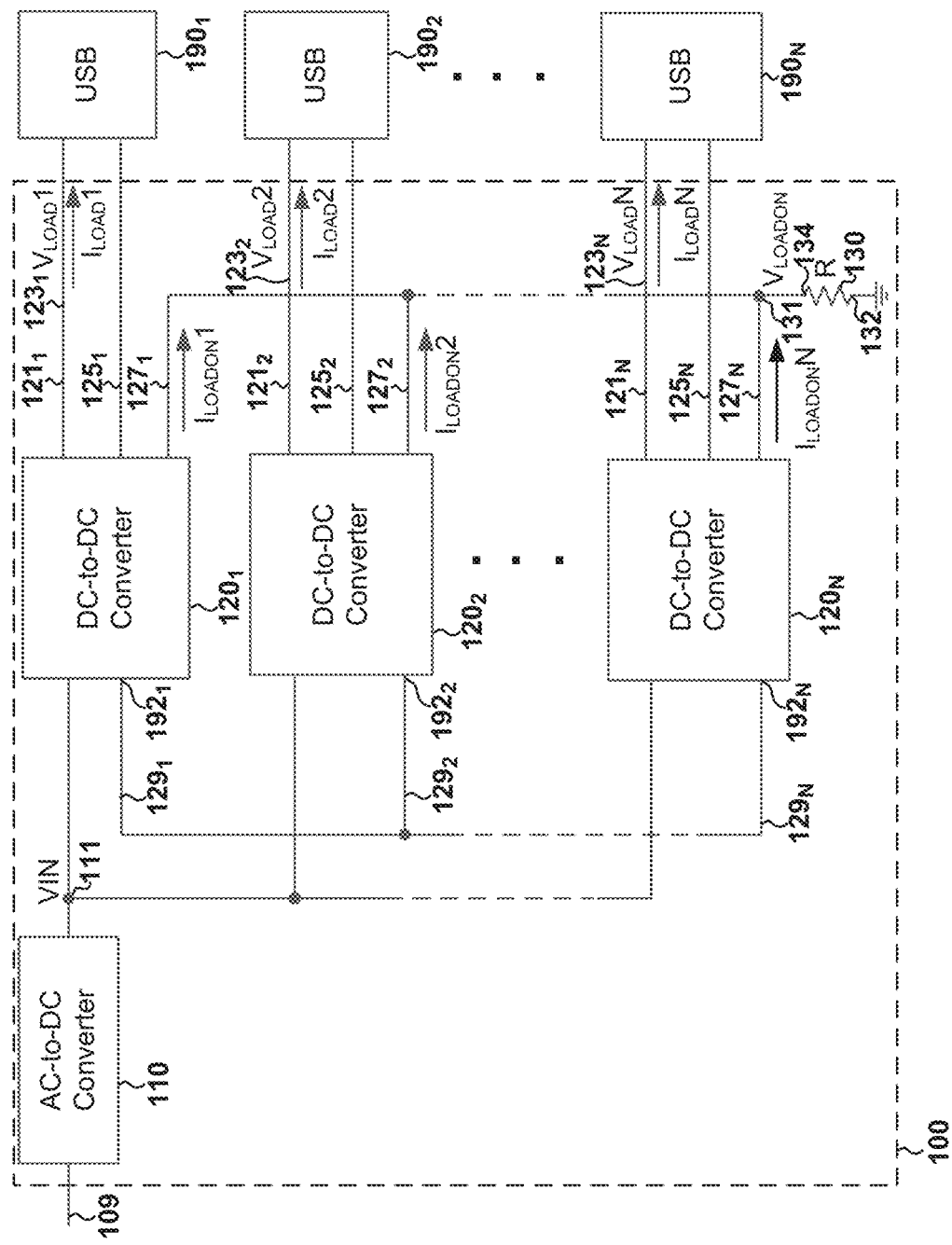
FIG. 1 is a simplified diagram showing a multiport charging system according to certain embodiments of the present disclosure.

FIG. 1 is a simplified diagram showing a multiport charging system according to certain embodiments of the present disclosure. This diagram is merely an example, which should not unduly limit the scope of the claims. One of ordinary skill in the art would recognize many variations, alternatives, and modifications. The multiport charging system 100 (e.g., a multi-output switching regulator) includes an AC-to-DC converter 110 (e.g., an AC-to-DC switching regulator), multiple DC-to-DC converters (e.g., multiple DC-to-DC switching regulators), and a resistor 130, wherein the multiple DC-to-DC converters include a DC-to-DC converter $120_1$, a DC-to-DC converter $120_2$, . . . , and a DC-to-DC converter $120_N$, N being an integer larger than 1. Although the above has been shown using a selected group of components for the multiport charging system, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

According to some embodiments, the AC-to-DC converter 110 (e.g., an AC-to-DC switching regulator) receives a voltage 109 (e.g., an input voltage) and generates a voltage 111 (e.g., VIN) based at least in part on the voltage 109. For example, the voltage 109 is an AC voltage. As an example, the voltage 111 (e.g., VIN) is a DC voltage. In certain examples, the voltage 111 (e.g., VIN) is received by each DC-to-DC converter of the multiple DC-to-DC converters. As an example, the voltage 111 (e.g., VIN) is received by a DC-to-DC converter $120_K$, wherein K is an integer that is larger than or equal to 1 and smaller than or equal to N, and N is an integer larger than 1.

In certain embodiments, the multiple DC-to-DC converters are connected to multiple USB output ports respectively. For example, the multiple DC-to-DC converters include the DC-to-DC converter $120_1$, the DC-to-DC converter $120_2$, . . . , and the DC-to-DC converter $120_N$, and the multiple USB output ports include a USB output port $190_1$, a USB output port $190_2$, . . . , and a USB output port $190_N$, wherein N is an integer larger than 1. In some examples, a DC-to-DC converter $120_K$ is connected to a corresponding USB output port $190_K$, wherein K is an integer that is larger than or equal to 1 and smaller than or equal to N, and N is an integer larger than 1. In certain examples, the DC-to-DC converter $120_K$ is connected to the USB output port $190_K$, and the DC-to-DC converter $120_K$ corresponds to the USB output port $190_K$, wherein K is an integer that is larger than or equal to 1 and smaller than or equal to N, and N is an integer larger than 1. For example, the DC-to-DC converter $120_1$ is connected to the USB output port $190_1$, and the DC-to-DC converter $120_1$ corresponds to the USB output port $190_1$. As an example, the DC-to-DC converter $120_2$ is connected to the USB output port $190_2$, and the DC-to-DC converter $120_2$ corresponds to the USB output port $190_2$. For example, the DC-to-DC converter $120_N$ is connected to the USB output port $190_N$, and the DC-to-DC converter $120_N$ corresponds to the USB output port $190_N$, wherein N is an integer larger than 1.

In some embodiments, the multiple DC-to-DC converters communicate with the multiple USB output ports using multiple communication signals respectively. For example, the multiple communication signals include a communication signal $125_1$, a communication signal $125_2$, ..., and a communication signal $125_N$, wherein N is an integer larger than 1. As an example, a DC-to-DC converter $120_K$ communicates with a USB output port $190_K$ using a communication signal $125_K$, wherein K is an integer that is larger than or equal to 1 and smaller than or equal to N, and N is an integer larger than 1. In certain examples, each DC-to-DC converter of the multiple DC-to-DC converters detects whether its corresponding USB output port is connected to any load (e.g., a mobile electronic device). For example, a DC-to-DC converter $120_K$ detects whether or not a corresponding USB output port $190_K$ is connected to any load based at least in part on a communication signal $125_K$, wherein K is an integer that is larger than or equal to 1 and smaller than or equal to N, and N is an integer larger than 1.

According to certain embodiments, the multiple DC-to-DC converters output multiple load detection currents based at least in part on the multiple communication signals respectively. For example, the multiple load detection currents include a load detection current $127_1$, a load detection current $127_2$, ..., and a load detection current $127_N$, wherein N is an integer larger than 1. As an example, a load detection current $127_K$ is equal to or larger than zero in magnitude, wherein K is an integer that is larger than or equal to 1 and smaller than or equal to N, and N is an integer larger than 1. In some examples, if a communication signal $125_K$ indicates that a corresponding USB output port $190_K$ is connected to a load (e.g., a mobile electronic device), a DC-to-DC converter $120_K$ outputs a load detection current $127_K$ that is larger than zero in magnitude. In certain examples, if a communication signal $125_K$ indicates that a corresponding USB output port $190_K$ is not connected to any load (e.g., a mobile electronic device), a DC-to-DC converter $120_K$ outputs a load detection current $127_K$ that is equal to zero in magnitude.

According to some embodiments, the multiple load detection currents flow from the multiple DC-to-DC converters through the resistor 130, which in response generates a detection voltage 131. In certain examples, the resistor 130 includes a resistor terminal 132 and a resistor terminal 134, wherein the resistor terminal 132 is biased to a ground voltage. For example, the load detection current $127_K$ is larger than or equal to zero in magnitude, wherein K is an integer that is larger than or equal to 1 and smaller than or equal to N, and N is an integer larger than 1. As an example, the detection voltage 131 is received by each DC-to-DC converter of the multiple DC-to-DC converters, which uses the detection voltage 131 to determine how many one or more USB output ports of the multiple USB output ports each are connected to a load.

In certain embodiments, the multiple DC-to-DC converters are configured to output one or more output voltages and one or more output currents to one or more USB output ports that are connected to one or more loads respectively. For example, the one or more output voltages include an output voltage $121_1$, an output voltage $121_2$, ..., and/or an output voltage $121_N$, and the one or more output currents include an output current $123_1$, an output current $123_2$, ..., and/or an output current $123_N$, wherein N is an integer larger than 1. As an example, a DC-to-DC converter $120_K$ outputs an output voltage $121_K$ and an output current $123_K$ to a USB output port $190_K$ that is connected to a load, wherein K is an integer that is larger than or equal to 1 and smaller than or equal to N, and N is an integer larger than 1. In some examples, for each DC-to-DC converter of the multiple DC-to-DC converters, if the DC-to-DC converter (e.g., a DC-to-DC converter $120_K$) corresponds to a USB output port that is connected to a load and all other one or more DC-to-DC converters correspond to one or more USB output ports that are not connected to any load, the DC-to-DC converter (a DC-to-DC converter $120_K$) operates as a voltage-to-voltage converter and generates an output voltage (e.g., an output voltage $121_K$) for the corresponding USB output port (e.g., a USB output port $190_K$). For example, the DC-to-DC converter $120_K$ operates as a voltage-to-voltage converter, and converts the voltage 111 (e.g., VIN) to the output voltage $121_K$. As an example, the voltage 111 (e.g., VIN) is a DC voltage, and the output voltage $121_K$ is also a DC voltage.

In some embodiments, the multiple DC-to-DC converters are configured to output one or more contributing currents from one or more contributing terminals to one USB output port that is connected to a load. For example, the one or more contributing currents include a contributing current $129_1$, a contributing current $129_2$, ..., and/or a contributing current $129_N$, and the one or more contributing terminals include a contributing terminal $192_1$, a contributing terminal $192_2$, ..., and a contributing terminal $192_N$, wherein N is an integer larger than 1. As an example, a DC-to-DC converter $120_K$ outputs a contributing current $129_K$ from a contributing terminal $192_K$, wherein K is an integer that is larger than or equal to 1 and smaller than or equal to N, and N is an integer larger than 1. In certain examples, for each DC-to-DC converter of the multiple DC-to-DC converters, if the DC-to-DC converter (e.g., a DC-to-DC converter $120_K$) corresponds to a USB output port that is not connected to any load, and among all other one or more DC-to-DC converters, only one DC-to-DC converter corresponds to a USB output port that is connected to a load, the DC-to-DC converter (e.g., a DC-to-DC converter $120_K$) operates as a voltage-to-current converter and generates a contributing current (e.g., a contributing current $129_K$) for the only one DC-to-DC converter corresponding to a USB output port that is connected to a load. For example, the DC-to-DC converter $120_K$ operates as a voltage-to-current converter, and converts the voltage 111 (e.g., VIN) to the contributing current $129_K$. As an example, the voltage 111 (e.g., VIN) is a DC voltage, and the contributing current $129_K$ is a DC current.

As mentioned above and further emphasized here, FIG. 1 is merely an example, which should not unduly limit the scope of the claims. One of ordinary skill in the art would recognize many variations, alternatives, and modifications. For example, the resistor 130 of the multiport charging system 100 is replaced by one or more other components that are used to determine how many one or more USB output ports of the multiple USB output ports of the multiport charging system 100 each are connected to a load.

Figure 2:
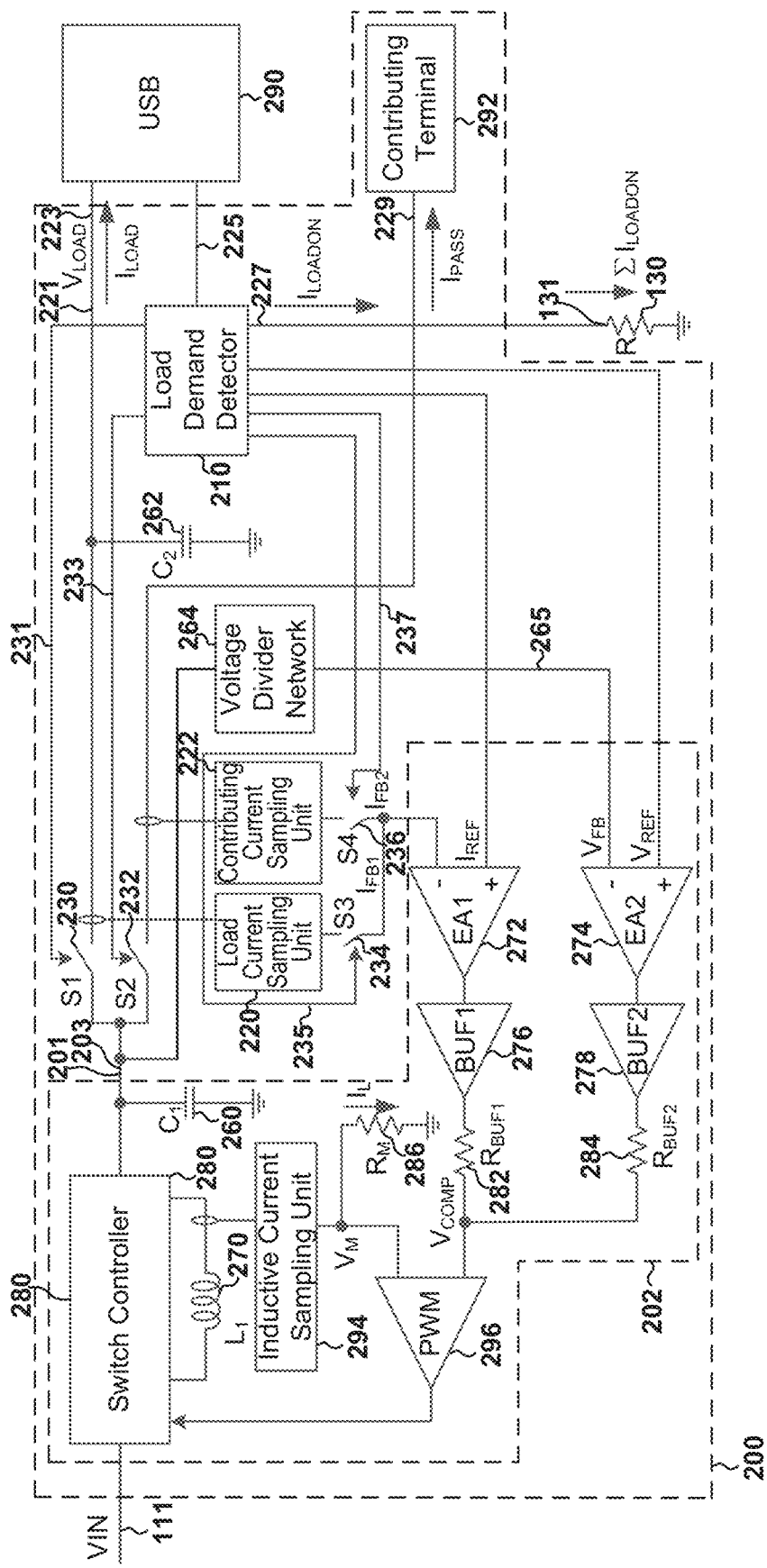
FIG. 2 is a simplified diagram showing certain components of a DC-to-DC converter as part of the multiport charging system as shown in FIG. 1 according to some embodiments of the present disclosure.

FIG. 2 is a simplified diagram showing certain components of a DC-to-DC converter as part of the multiport charging system 100 as shown in FIG. 1 according to some embodiments of the present disclosure. This diagram is merely an example, which should not unduly limit the scope of the claims. One of ordinary skill in the art would recognize many variations, alternatives, and modifications. The DC-to-DC converter 200 (e.g., a DC-to-DC switching regulator) includes a load demand detector 210 (e.g., a load detector), a load current sampling unit 220, a contributing current sampling unit 222, switches 230, 232, 234 and 236, capacitors 260 and 262, a voltage divider network 264, an inductive coil 270, error amplifiers 272 and 274, buffers 276 and 278, a switch controller 280, resistors 282, 284 and 286, an inductive current sampling unit 294, and a comparator 296. In certain examples, the capacitor 260, the inductive coil 270, the error amplifiers 272 and 274, the buffers 276 and 278, the switch controller 280, the resistors 282, 284 and 286, the inductive current sampling unit 294, and the comparator 296 are parts of a voltage/current generator 202 (e.g., a generator), which is configured to generate a voltage 201 and/or a current 203. For example, the voltage/current generator 202 generates the voltage 201 based at least in part on the voltage 111 (e.g., VIN) when the DC-to-DC converter 200 (e.g., a DC-to-DC converter 120$_K$) operates as a voltage-to-voltage converter. As an example, the voltage/current generator 202 generates the current 203 based at least in part on the voltage 111 (e.g., VIN) when the DC-to-DC converter 200 (e.g., a DC-to-DC converter 120$_K$) operates as a voltage-to-current converter. In some examples, the DC-to-DC converter 200 (e.g., a DC-to-DC switching regulator) includes a DC-to-DC controller. For example, the voltage 201 is a DC voltage. As an example, the current 203 is a DC current. Although the above has been shown using a selected group of components for the DC-to-DC converter, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

According to certain embodiments, the DC-to-DC converter 200 is connected to a USB output port 290. For example, the DC-to-DC converter 200 is a DC-to-DC converter 120$_K$, wherein K is an integer that is larger than or equal to 1 and smaller than or equal to N, and N is an integer larger than 1. As an example, the USB output port 290 is a USB output port 190$_K$, wherein K is an integer that is larger than or equal to 1 and smaller than or equal to N, and N is an integer larger than 1. In some examples, the DC-to-DC converter 200 (e.g., a DC-to-DC converter 120$_K$) communicates with the USB output port 290 (e.g., a USB output port 190$_K$) using a communication signal 225. For example, the communication signal 225 is a communication signal 125$_K$, wherein K is an integer that is larger than or equal to 1 and smaller than or equal to N, and N is an integer larger than 1. In certain examples, the DC-to-DC converter 200 (e.g., a DC-to-DC converter 120$_K$) is configured to output an output voltage 221 and an output current 223 to the USB output port 290 (e.g., a USB output port 190$_K$). For example, the output voltage 221 is an output voltage 121$_K$, wherein K is an integer that is larger than or equal to 1 and smaller than or equal to N, and N is an integer larger than 1. As an example, the output current 223 is an output current 123$_K$, wherein K is an integer that is larger than or equal to 1 and smaller than or equal to N, and N is an integer larger than 1. In some examples, the DC-to-DC converter 200 (e.g., a DC-to-DC converter 120$_K$) is configured to output a contributing current 229 from a contributing terminal 292 to one USB output port that is connected to a load. For example, the contributing current 229 is a contributing current 129$_K$, wherein K is an integer that is larger than or equal to 1 and smaller than or equal to N, and N is an integer larger than 1. As an example, the contributing terminal 292 is a contributing terminal 192$_K$, wherein K is an integer that is larger than or equal to 1 and smaller than or equal to N, and N is an integer larger than 1. In certain examples, the DC-to-DC converter 200 (e.g., a DC-to-DC converter 120$_K$) outputs a load detection current 227 that is equal to or larger than zero in magnitude. For example, the load detection current 227 is a load detection current 127$_K$, wherein K is an integer that is larger than or equal to 1 and smaller than or equal to N, and N is an integer larger than 1.

In some embodiments, the load demand detector 210 of the DC-to-DC converter 200 (e.g., a DC-to-DC converter 120$_K$) communicates with the USB output port 290 (e.g., a USB output port 190$_K$) using the communication signal 225 (e.g., a communication signal 125$_K$). For example, the load demand detector 210 determines whether the USB output port 290 is connected to any load based at least in part on the communication signal 225. In certain examples, the load demand detector 210 of the DC-to-DC converter 200 (e.g., a DC-to-DC converter 120$_K$) receives the detection voltage 131, and determines whether any other DC-to-DC converter of the multiple DC-to-DC converters of the multiport charging system 100 is connected to any load based at least in part on the detection voltage 131. In some examples, if the USB output port 290 is connected to a load, the voltage/current generator 202 generates the voltage 201 based at least in part on the voltage 111 (e.g., VIN). For example, the voltage 201 is used as the output voltage 221 for the USB output port 290. In certain examples, if the USB output port 290 is not connected to any load, and among all other one or more DC-to-DC converters of the multiple DC-to-DC converters of the multiport charging system 100, only one DC-to-DC converter corresponds to a USB output port that is connected to a load, the voltage/current generator 202 generates the contributing current 229 based at least in part on the voltage 111 (e.g., VIN). For example, the contributing current 229 is used as a part of the output current for the USB output port that is connected to a load and corresponds to the only one DC-to-DC converter.

In certain embodiments, the load demand detector 210 of the DC-to-DC converter 200 (e.g., a DC-to-DC converter 120$_K$) determines whether the USB output port 290 is connected to any load based at least in part on the communication signal 225, and outputs the load detection current 227 that is equal to or larger than zero in magnitude. For example, if the USB output port 290 is connected to a load, the load detection current 227 is equal to a predetermined magnitude ($I_p$) that is larger than zero. As an example, the USB output port 290 is not connected to any load, the load detection current 227 is equal to zero in magnitude. In certain examples, the load demand detector 210 receives the detection voltage 131 that is generated by the resistor 130.

According to some embodiments, the resistor 130 includes the resistor terminal 132 and the resistor terminal 134, wherein the resistor terminal 132 is biased to the ground voltage. For example, the detection voltage 131 that is generated at the resistor terminal 134 is determined as follows:

$$V_{131} = m \times I_p \times R \qquad \text{(Equation 1)}$$

where $V_{131}$ represents the detection voltage 131 that is generated by the resistor 130, and R represents the resistance of the resistor 130. Additionally, $I_p$ represents a predetermined magnitude of the load detection current 227 if the USB output port 290 is connected to a load, wherein the predetermined magnitude is larger than zero. Moreover, m is an integer that represents, among the multiple DC-to-DC converters of the multiport charging system 100, the total number of DC-to-DC converters that correspond to one or more USB output ports connected to one or more loads respectively. In some examples, m is equal to zero, is equal to one, or is larger than one (e.g., being equal to two). For example, m is equal to zero, indicating that none of the multiple USB output ports is connected to a load, wherein the multiple USB output ports include the USB output port $190_1$, the USB output port $190_2$, ... and the USB output port $190_N$, N being an integer larger than 1. As an example, m is equal to one, indicating that only one port of the multiple USB output ports is connected to a load, wherein the multiple USB output ports include the USB output port $190_1$, the USB output port $190_2$, ..., and the USB output port $190_N$, N being an integer larger than 1. As an example, m is equal to two, indicating that only two ports of the multiple USB output ports are each connected to a load, wherein the multiple USB output ports include the USB output port $190_1$, the USB output port $190_2$, ..., and the USB output port $190_N$, N being an integer larger than 1. In certain examples, $m \times I_p$ represents the magnitude of the total current that flows through the resistor 130.

According to certain embodiments, the load demand detector 210 of the DC-to-DC converter 200 (e.g., a DC-to-DC converter $120_K$) determines whether the USB output port 290 (e.g., a USB output port $190_K$) that corresponds to the DC-to-DC converter 200 is connected to any load. In some examples, if the load demand detector 210 determines the USB output port 290 that corresponds to the DC-to-DC converter 200 is connected to a load, the number of one or more other USB output ports, corresponding to one or more other DC-to-DC converters, that are connected to one or more other loads is equal to the total number (e.g., m) of one or more USB output ports that are connected to one or more loads respectively subtracted by one. In certain examples, if the load demand detector 210 determines the USB output port 290 that corresponds to the DC-to-DC converter 200 is not connected to any load, the number of one or more other USB output ports, corresponding to one or more other DC-to-DC converters, that are connected to one or more other loads is equal to the total number (e.g., m) of one or more USB output ports that are connected to one or more loads respectively among the multiple USB output ports that correspond to the multiple DC-to-DC converters of the multiport charging system 100. For example, if the load demand detector 210 determines the USB output port 290 that corresponds to the DC-to-DC converter 200 is not connected to any load, and also determines the number of one or more other USB output ports, corresponding to one or more other DC-to-DC converters, that are connected to one or more other loads is equal to one, only one USB output port, among all other one or more USB output ports, is connected to a load.

According to some embodiments, when the load demand detector 210 of the DC-to-DC converter 200 (e.g., a DC-to-DC converter $120_K$) determines that the USB output port 290 is connected to a load, the load demand detector 210 also obtains the load demand information for the USB output port 290. For example, the load demand information for the USB output port 290 includes a load demand voltage for the USB output port 290 and/or a load demand current for the USB output port 290. In certain examples, the load demand detector 210 communicates with a load (e.g., a mobile electronic device) that is connected to the USB output port 290 (e.g., a USB Type-C output port or a USB Type-A output port) in order to obtain the load demand information based at least in part on a charging protocol. For example, if the USB output port 290 is a USB Type-A output port, the load demand detector 210 communicates with a load that is connected to the USB output port 290 based at least in part on a quick charging (QC) protocol, a firewall communication protocol (FCP), an adaptive fast charging (AFC) protocol, and/or a standard communication protocol (SCP). As an example, if the USB output port 290 is a USB Type-C output port, the load demand detector 210 communicates with a load that is connected to the USB output port 350 based at least in part on a power delivery (PD) protocol. In some examples, if the load demand detector 210 of the DC-to-DC converter 200 (e.g., a DC-to-DC converter $120_K$) determines that the USB output port 290 is connected to a load, based at least in part on the load demand information for the USB output port 290, the load demand detector 210 generates a reference voltage $V_{REF}$ and a reference current $I_{REF}$ for the USB output port 290. For example, if the load demand detector 210 of the DC-to-DC converter 200 (e.g., a DC-to-DC converter $120_K$) determines that the USB output port 290 is connected to a load, the reference voltage $V_{REF}$ represents the load demand voltage for the USB output port 290. As an example, if the load demand detector 210 of the DC-to-DC converter 200 (e.g., a DC-to-DC converter $120_K$) determines that the USB output port 290 is connected to a load, the reference current $I_{REF}$ represents the load demand current for the USB output port 290. In certain examples, if the load demand detector 210 determines that the USB output port 290 is connected to a load, the voltage/current generator 202 receives the reference voltage $V_{REF}$ and a voltage that represents the reference current $I_{REF}$, wherein the reference voltage $V_{REF}$ represents the load demand voltage for the USB output port 290, and the reference current $I_{REF}$ represents the load demand current for the USB output port 290.

According to certain embodiments, when the load demand detector 210 of the DC-to-DC converter 200 (e.g., a DC-to-DC converter $120_K$) determines that the USB output port 290 is not connected to any load and that among all other one or more DC-to-DC converters of the multiple DC-to-DC converters of the multiport charging system 100, only one DC-to-DC converter corresponds to a USB output port that is connected to a load, the load demand detector 210 generates the reference voltage $V_{REF}$ and the reference current $I_{REF}$ based at least in part on the maximum output power of the DC-to-DC converter 200 (e.g., a DC-to-DC converter $120_K$). For example, the maximum output power of the DC-to-DC converter 200 (e.g., a DC-to-DC converter $120_K$) is the maximum output power of the voltage/current generator 202. As an example, the maximum output power of the DC-to-DC converter 200 (e.g., a DC-to-DC converter $120_K$) is determined without taking into account any contributing current that is received by the DC-to-DC converter 200 and is generated by any other DC-to-DC converter. In some examples, if the load demand detector 210 determines that the USB output port 290 is not connected to any load and that among all other one or more DC-to-DC converters of the multiple DC-to-DC converters of the multiport charging system 100, only one DC-to-DC converter corresponds to a USB output port that is connected to a load, the voltage/current generator 202 receives the reference voltage $V_{REF}$ and a voltage that represents the reference current $I_{REF}$, wherein the reference voltage $V_{REF}$ and the reference current $I_{REF}$ are generated based at least in part on the maximum output power of the DC-to-DC converter 200.

In some embodiments, if the load demand detector 210 of the DC-to-DC converter 200 (e.g., a DC-to-DC converter $120_K$) determines that the USB output port 290 is connected to a load, the load current sampling unit 220 samples the output current 223 and generates a feedback current $I_{FB1}$ based at least in part on the sampled output current 223. For example, if the load demand detector 210 of the DC-to-DC converter 200 (e.g., a DC-to-DC converter $120_K$) determines that the USB output port 290 is connected to a load, the feedback current $I_{FB1}$ represents the output current 223. As an example, if the load demand detector 210 determines that the USB output port 290 is connected to a load, the error amplifier 272 of the voltage/current generator 202 receives a voltage that represents the feedback current $I_{FB1}$, wherein the feedback current $I_{FB1}$ represents the output current 223.

In certain embodiments, if the load demand detector 210 of the DC-to-DC converter 200 (e.g., a DC-to-DC converter $120_K$) determines that the USB output port 290 is not connected to any load and that among all other one or more DC-to-DC converters of the multiple DC-to-DC converters of the multiport charging system 100, only one DC-to-DC converter corresponds to a USB output port that is connected to a load, the contributing current sampling unit 222 samples the contributing current 229 and generates the feedback current $I_{FB2}$ based at least in part on the sampled contributing current 229. In certain examples, if the load demand detector 210 of the DC-to-DC converter 200 (e.g., a DC-to-DC converter $120_K$) determines that the USB output port 290 is not connected to any load and that among all other one or more DC-to-DC converters of the multiple DC-to-DC converters of the multiport charging system 100, only one DC-to-DC converter corresponds to a USB output port that is connected to a load, the feedback current $I_{FB2}$ represents the contributing current 229. As an example, if the load demand detector 210 determines that the USB output port 290 is not connected to any load and that among all other one or more DC-to-DC converters of the multiple DC-to-DC converters of the multiport charging system 100, only one DC-to-DC converter corresponds to a USB output port that is connected to a load, the error amplifier 272 of the voltage/current generator 202 receives a voltage that represents the feedback current $I_{FB2}$, wherein the feedback current $I_{FB2}$ represents the contributing current 229.

As shown in FIG. 2, the voltage divider network 264 receives the voltage 201 and generates a feedback voltage 265 based at least in part on the voltage 201 according to some embodiments. For example, the voltage/current generator 202 receives the feedback voltage 265. In certain examples, if the load demand detector 210 determines that the USB output port 290 is connected to a load, the voltage/current generator 202 receives the reference voltage $V_{REF}$, a voltage that represents the reference current $I_{REF}$, a voltage that represents the feedback current $I_{FB1}$, and the feedback voltage 265, wherein the reference voltage $V_{REF}$ represents the load demand voltage for the USB output port 290, the reference current $I_{REF}$ represents the load demand current for the USB output port 290, and the feedback current $I_{FB1}$ represents the output current 223. For example, if the load demand detector 210 determines that the USB output port 290 is connected to a load, based on at least information associated with the reference voltage $V_{REF}$, the reference current $I_{REF}$, the feedback current $I_{FB1}$, and the feedback voltage 265, the voltage/current generator 202 converts the voltage 111 (e.g., VIN) to the voltage 201, wherein the DC-to-DC converter 200 operates as a voltage-to-voltage converter, and the voltage 201 is used as the output voltage 221. In some examples, if the load demand detector 210 determines that the USB output port 290 is not connected to any load and that among all other one or more DC-to-DC converters of the multiple DC-to-DC converters of the multiport charging system 100, only one DC-to-DC converter corresponds to a USB output port that is connected to a load, the voltage/current generator 202 receives the reference voltage $V_{REF}$, a voltage that represents the reference current $I_{REF}$, a voltage that represents the feedback current $I_{FB2}$, and the feedback voltage 265, wherein the reference voltage $V_{REF}$ and the reference current $I_{REF}$ are generated based at least in part on the maximum output power of the DC-to-DC converter 200, and the feedback current $I_{FB2}$ represents the contributing current 229. For example, if the load demand detector 210 determines that the USB output port 290 is not connected to any load and that among all other one or more DC-to-DC converters of the multiple DC-to-DC converters of the multiport charging system 100, only one DC-to-DC converter corresponds to a USB output port that is connected to a load, based on at least information associated with the reference voltage $V_{REF}$, the reference current $I_{REF}$, the feedback current $I_{FB2}$, and the feedback voltage 265, the voltage/current generator 202 converts the voltage 111 (e.g., VIN) to the current 203, wherein the DC-to-DC converter 200 operates as a voltage-to-current converter, and the current 203 is used as the contributing current 229.

According to certain embodiments, the switch 230 is coupled to the switch controller 280 and the USB output port 290, the switch 232 is coupled to the switch controller 280 and the contributing terminal 292, the switch 234 is coupled to the load current sampling unit 220 and the error amplifier 272, and the switch 236 is coupled to the contributing current sampling unit 222 and the error amplifier 272. For example, the voltage/current generator 202 includes the switch controller 280 and the error amplifier 272.

In some examples, the switch 230 receives a control signal 231 that is generated by the load demand detector 210, and the control signal 231 is used to open and/or close the switch 230. For example, if the load demand detector 210 determines that the USB output port 290 is connected to a load, the load demand detector 210 generates the control signal 231 to close the switch 230. As an example, if the load demand detector 210 determines that the USB output port 290 is not connected to any load, the load demand detector 210 generates the control signal 231 to open the switch 230.

In certain examples, the switch 232 receives a control signal 233 that is generated by the load demand detector 210, and the control signal 233 is used to open and/or close the switch 232. For example, if the load demand detector 210 determines that the USB output port 290 is connected to a load, and among all other one or more DC-to-DC converters of the multiple DC-to-DC converters of the multiport charging system 100, no DC-to-DC converter corresponds to a USB output port that is connected to any load, or if the load demand detector 210 determines that the USB output port 290 is not connected to any load and that among all other one or more DC-to-DC converters of the multiple DC-to-DC converters of the multiport charging system 100, only one DC-to-DC converter corresponds to a USB output port that is connected to a load, the load demand detector 210 generates the control signal 233 to close the switch 232. As an example, if the load demand detector 210 determines that the USB output port 290 is connected to a load, and among all other one or more DC-to-DC converters of the multiple DC-to-DC converters of the multiport charging system 100, at least one DC-to-DC converter corresponds to a USB output port that is connected to a load, or if the load demand detector 210 determines that the USB output port 290 is not connected to any load and that among all other one or more DC-to-DC converters of the multiple DC-to-DC converters of the multiport charging system 100, at least two DC-to-DC converters each correspond to a USB output port that is connected to a load, the load demand detector 210 generates the control signal 233 to open the switch 232.

In certain examples, the switch 234 receives a control signal 235 that is generated by the load demand detector 210, and the control signal 235 is used to open and/or close the switch 234. For example, if the load demand detector 210 of the DC-to-DC converter 200 determines that the USB output port 290 is connected to a load, the load demand detector 210 generates the control signal 235 to close the switch 234. As an example, if the load demand detector 210 of the DC-to-DC converter 200 determines that the USB output port 290 is not connected to a load, the load demand detector 210 generates the control signal 235 to open the switch 234.

In some examples, the switch 236 receives a control signal 237 that is generated by the load demand detector 210, and the control signal 237 is used to open and/or close the switch 236. For example, if the load demand detector 210 determines that the USB output port 290 is not connected to any load and that among all other one or more DC-to-DC converters of the multiple DC-to-DC converters of the multiport charging system 100, only one DC-to-DC converter corresponds to a USB output port that is connected to a load, the load demand detector 210 generates the control signal 237 to close the switch 236. As an example, if the load demand detector 210 determines that the USB output port 290 is connected to a load, or if the load demand detector 210 determines that the USB output port 290 is not connected to any load and that among all other one or more DC-to-DC converters of the multiple DC-to-DC converters of the multiport charging system 100, at least two DC-to-DC converters each correspond to a USB output port that is connected to a load, the load demand detector 210 generates the control signal 237 to open the switch 236.

In some embodiments, if the load demand detector 210 determines that the USB output port 290 is not connected to any load and that among all other one or more DC-to-DC converters of the multiple DC-to-DC converters of the multiport charging system 100, only one DC-to-DC converter corresponds to a USB output port that is connected to a load, the contributing current 229 flows out of the contributing terminal 292 to the USB outport that is connected to a load and corresponds to the only one DC-to-DC converter output port.

In certain embodiments, if the USB output port 290 is connected to a load, and if among all other one or more DC-to-DC converters of the multiple DC-to-DC converters of the multiport charging system 100, no DC-to-DC converter corresponds to a USB output port that is connected to any load, the voltage/current generator 202 generates the voltage 201 and/or the current 203, and the contributing terminal 292 receives one or more contributing currents generated by all other one or more DC-to-DC converters of the multiple DC-to-DC converters of the multiport charging system 100. For example, if the USB output port 290 is connected to a load, and if among all other one or more DC-to-DC converters of the multiple DC-to-DC converters of the multiport charging system 100, no DC-to-DC converter corresponds to a USB output port that is connected to any load, the voltage 201 is used as the output voltage 221 for the USB output port 290, and the current 203 and the one or more contributing currents generated by all other one or more DC-to-DC converters are used as the output current 223 for the USB output port 290, wherein the output current 223 is equal to a sum of the current 203 and the one or more contributing currents generated by all other one or more DC-to-DC converters.

According to some embodiments, if the load demand detector 210 determines that the USB output port 290 is not connected to any load, and among all other one or more DC-to-DC converters of the multiple DC-to-DC converters of the multiport charging system 100, no DC-to-DC converter corresponds to a USB output port that is connected to any load, the load demand detector 210 generates the control signal 231 to open the switch 230, generates the control signal 233 to open the switch 232, generates the control signal 235 to open the switch 234, and generates the control signal 237 to open the switch 236. For example, if the load demand detector 210 determines that the USB output port 290 is not connected to any load, and among all other one or more DC-to-DC converters of the multiple DC-to-DC converters of the multiport charging system 100, no DC-to-DC converter corresponds to a USB output port that is connected to any load, the output voltage 221 is not generated, the output current 223 is not generated, and the contributing current 229 is not generated. As an example, if the load demand detector 210 determines that the USB output port 290 is not connected to any load, and among all other one or more DC-to-DC converters of the multiple DC-to-DC converters of the multiport charging system 100, no DC-to-DC converter corresponds to a USB output port that is connected to any load, no contributing current is generated by any of all other one or more DC-to-DC converters of the multiple DC-to-DC converters of the multiport charging system 100. For example, if the load demand detector 210 determines that the USB output port 290 is not connected to any load, and among all other one or more DC-to-DC converters of the multiple DC-to-DC converters of the multiport charging system 100, no DC-to-DC converter corresponds to a USB output port that is connected to any load, the error amplifier 272 of the voltage/current generator 202 does not receive any voltage that represents the feedback current $I_{FB1}$ and also does not receive any voltage that represents the feedback current $I_{FB2}$, wherein the feedback current $I_{FB1}$ represents the output current 223, and the feedback current $I_{FB2}$ represents the contributing current 229.

According to certain embodiments, if the load demand detector 210 determines that the USB output port 290 is connected to a load, and among all other one or more DC-to-DC converters of the multiple DC-to-DC converters of the multiport charging system 100, no DC-to-DC converter corresponds to a USB output port that is connected to any load, the switch 230 is closed, the switch 232 is closed, the switch 234 is closed, and the switch 236 is open. For example, if the load demand detector 210 determines that the USB output port 290 is connected to a load, and among all other one or more DC-to-DC converters of the multiple DC-to-DC converters of the multiport charging system 100, no DC-to-DC converter corresponds to a USB output port that is connected to any load, the voltage 201 is used as the output voltage 221 for the USB output port 290, and the current 203 and the one or more contributing currents generated by all other one or more DC-to-DC converters are used as the output current 223 for the USB output port 290, wherein the current 203 flows through the switch 230 to the USB output port 290, the one or more contributing currents generated by all other one or more DC-to-DC converters flow from the contributing terminal 292 through the switch 232 and the switch 230 to the USB output port 290, and the output current 223 is equal to a sum of the current 203 and the one or more contributing currents generated by all other one or more DC-to-DC converters. As an example, if the load demand detector 210 determines that the USB output port 290 is connected to a load, and among all other one or more DC-to-DC converters of the multiple DC-to-DC converters of the multiport charging system 100, no DC-to-DC converter corresponds to a USB output port that is connected to any load, the voltage/current generator 202 generates the voltage 201 based at least in part on the voltage 111 (e.g., VIN), and the DC-to-DC converter 200 (e.g., a DC-to-DC converter $120_K$) operates as a voltage-to-voltage converter. For example, if the load demand detector 210 determines that the USB output port 290 is connected to a load, and among all other one or more DC-to-DC converters of the multiple DC-to-DC converters of the multiport charging system 100, no DC-to-DC converter corresponds to a USB output port that is connected to any load, the error amplifier 272 of the voltage/current generator 202 receives a voltage that represents the feedback current $I_{FB1}$, wherein the feedback current $I_{FB1}$ represents the output current 223.

According to some embodiments, if the load demand detector 210 determines that the USB output port 290 is connected to a load, and among all other one or more DC-to-DC converters of the multiple DC-to-DC converters of the multiport charging system 100, at least one DC-to-DC converter corresponds to a USB output port that is connected to a load, the switch 230 is closed, the switch 232 is open, the switch 234 is closed, and the switch 236 is open. For example, if the load demand detector 210 determines that the USB output port 290 is connected to a load, and among all other one or more DC-to-DC converters of the multiple DC-to-DC converters of the multiport charging system 100, at least one DC-to-DC converter corresponds to a USB output port that is connected to a load, the voltage 201 is used as the output voltage 221 for the USB output port 290, and the current 203 is used, without any contributing current from any other DC-to-DC converter, as the output current 223 for the USB output port 290, wherein the current 203 flows through the switch 230 to the USB output port 290, and the output current 223 is equal to the current 203. As an example, if the load demand detector 210 determines that the USB output port 290 is connected to a load, and among all other one or more DC-to-DC converters of the multiple DC-to-DC converters of the multiport charging system 100, at least one DC-to-DC converter corresponds to a USB output port that is connected to a load, the voltage/current generator 202 generates the voltage 201 based at least in part on the voltage 111 (e.g., VIN), and the DC-to-DC converter 200 (e.g., a DC-to-DC converter $120_K$) operates as a voltage-to-voltage converter. For example, if the load demand detector 210 determines that the USB output port 290 is connected to a load, and among all other one or more DC-to-DC converters of the multiple DC-to-DC converters of the multiport charging system 100, at least one DC-to-DC converter corresponds to a USB output port that is connected to a load, the error amplifier 272 of the voltage/current generator 202 receives a voltage that represents the feedback current $I_{FB1}$, wherein the feedback current $I_{FB1}$ represents the output current 223.

According to certain embodiments, if the load demand detector 210 determines that the USB output port 290 is not connected to any load and that among all other one or more DC-to-DC converters of the multiple DC-to-DC converters of the multiport charging system 100, only one DC-to-DC converter corresponds to a USB output port that is connected to a load, the switch 230 is open, the switch 232 is closed, the switch 234 is open, and the switch 236 is closed. For example, if the load demand detector 210 determines that the USB output port 290 is not connected to any load and that among all other one or more DC-to-DC converters of the multiple DC-to-DC converters of the multiport charging system 100, only one DC-to-DC converter corresponds to a USB output port that is connected to a load, the current 203 is used as the contributing current 229, wherein the current 203 flows through the switch 232 to the contributing terminal 292, and then the current 203 flows to the USB output port that is connected to a load and corresponds to the only one DC-to-DC converter output port. As an example, if the load demand detector 210 determines that the USB output port 290 is not connected to any load and that among all other one or more DC-to-DC converters of the multiple DC-to-DC converters of the multiport charging system 100, only one DC-to-DC converter corresponds to a USB output port that is connected to a load, the voltage/current generator 202 generates the current 203 based at least in part on the voltage 111 (e.g., VIN), and the DC-to-DC converter 200 (e.g., a DC-to-DC converter $120_K$) operates as a voltage-to-current converter. For example, if the load demand detector 210 determines that the USB output port 290 is not connected to any load and that among all other one or more DC-to-DC converters of the multiple DC-to-DC converters of the multiport charging system 100, only one DC-to-DC converter corresponds to a USB output port that is connected to a load, the error amplifier 272 of the voltage/current generator 202 receives a voltage that represents the feedback current $I_{FB2}$, wherein the feedback current $I_{FB2}$ represents the contributing current 229.

According to certain embodiments, if the load demand detector 210 determines that the USB output port 290 is not connected to any load and that among all other one or more DC-to-DC converters of the multiple DC-to-DC converters of the multiport charging system 100, at least two DC-to-DC converters each correspond to a USB output port that is connected to a load, the switch 230 is open, the switch 232 is open, the switch 234 is open, and the switch 236 is open. For example, if the load demand detector 210 determines that the USB output port 290 is not connected to any load and that among all other one or more DC-to-DC converters of the multiple DC-to-DC converters of the multiport charging system 100, at least two DC-to-DC converters each correspond to a USB output port that is connected to a load, the output voltage 221 is not generated, the output current 223 is not generated, and the contributing current 229 is not generated. As an example, if the load demand detector 210 determines that the USB output port 290 is not connected to any load and that among all other one or more DC-to-DC converters of the multiple DC-to-DC converters of the multiport charging system 100, at least two DC-to-DC converters each correspond to a USB output port that is connected to a load, no contributing current is generated by any of all other one or more DC-to-DC converters of the multiple DC-to-DC converters of the multiport charging system 100. For example, if the load demand detector 210 determines that the USB output port 290 is not connected to any load and that among all other one or more DC-to-DC converters of the multiple DC-to-DC converters of the multiport charging system 100, at least two DC-to-DC converters each correspond to a USB output port that is connected to a load, the error amplifier 272 of the voltage/current generator 202 does not receive any voltage that represents the feedback current $I_{FB1}$ and also does not receive any voltage that represents the feedback current $I_{FB2}$, wherein the feedback current $I_{FB1}$ represents the output current 223, and the feedback current $I_{FB2}$ represents the contributing current 229.

In some examples, if the load demand detector 210 determines that the USB output port 290 is connected to a load, the load demand detector 210 generates the control signal 231 to close the switch 230 and generates the control signal 235 to close the switch 234. In certain examples, if the load demand detector 210 determines that the USB output port 290 is not connected to any load, the load demand detector 210 generates the control signal 231 to open the switch 230 and generates the control signal 235 to open the switch 234.

In certain examples, if the load demand detector 210 determines that the USB output port 290 is connected to a load, and among all other one or more DC-to-DC converters of the multiple DC-to-DC converters of the multiport charging system 100, no DC-to-DC converter corresponds to a USB output port that is connected to any load, the load demand detector 210 generates the control signal 233 to close the switch 232 and generates the control signal 237 to open the switch 236. In some examples, if the load demand detector 210 determines that the USB output port 290 is not connected to any load and that among all other one or more DC-to-DC converters of the multiple DC-to-DC converters of the multiport charging system 100, only one DC-to-DC converter corresponds to a USB output port that is connected to a load, the load demand detector 210 generates the control signal 233 to close the switch 232 and generates the control signal 237 to close the switch 236.

In certain examples, if the load demand detector 210 determines that the USB output port 290 is connected to a load, and among all other one or more DC-to-DC converters of the multiple DC-to-DC converters of the multiport charging system 100, at least one DC-to-DC converter corresponds to a USB output port that is connected to a load, the load demand detector 210 generates the control signal 233 to open the switch 232 and generates the control signal 237 to open the switch 236. In some examples, if the load demand detector 210 determines that the USB output port 290 is not connected to any load and that among all other one or more DC-to-DC converters of the multiple DC-to-DC converters of the multiport charging system 100, at least two DC-to-DC converters each correspond to a USB output port that is connected to a load, the load demand detector 210 generates the control signal 233 to open the switch 232 and generates the control signal 237 to open the switch 236. In certain examples, if the load demand detector 210 determines that the USB output port 290 is not connected to any load, and among all other one or more DC-to-DC converters of the multiple DC-to-DC converters of the multiport charging system 100, no DC-to-DC converter corresponds to a USB output port that is connected to any load, the load demand detector 210 generates the control signal 233 to open the switch 232 and generates the control signal 237 to open the switch 236.

In some embodiments, the load current sampling unit 220 is implemented using one or more software components, one or more hardware components, and/or one or more combinations of software and hardware components. In certain embodiments, the contributing current sampling unit 222 is implemented using one or more software components, one or more hardware components, and/or one or more combinations of software and hardware components. In some embodiments, the inductive current sampling unit 294 is implemented using one or more software components, one or more hardware components, and/or one or more combinations of software and hardware components.

Figure 3:
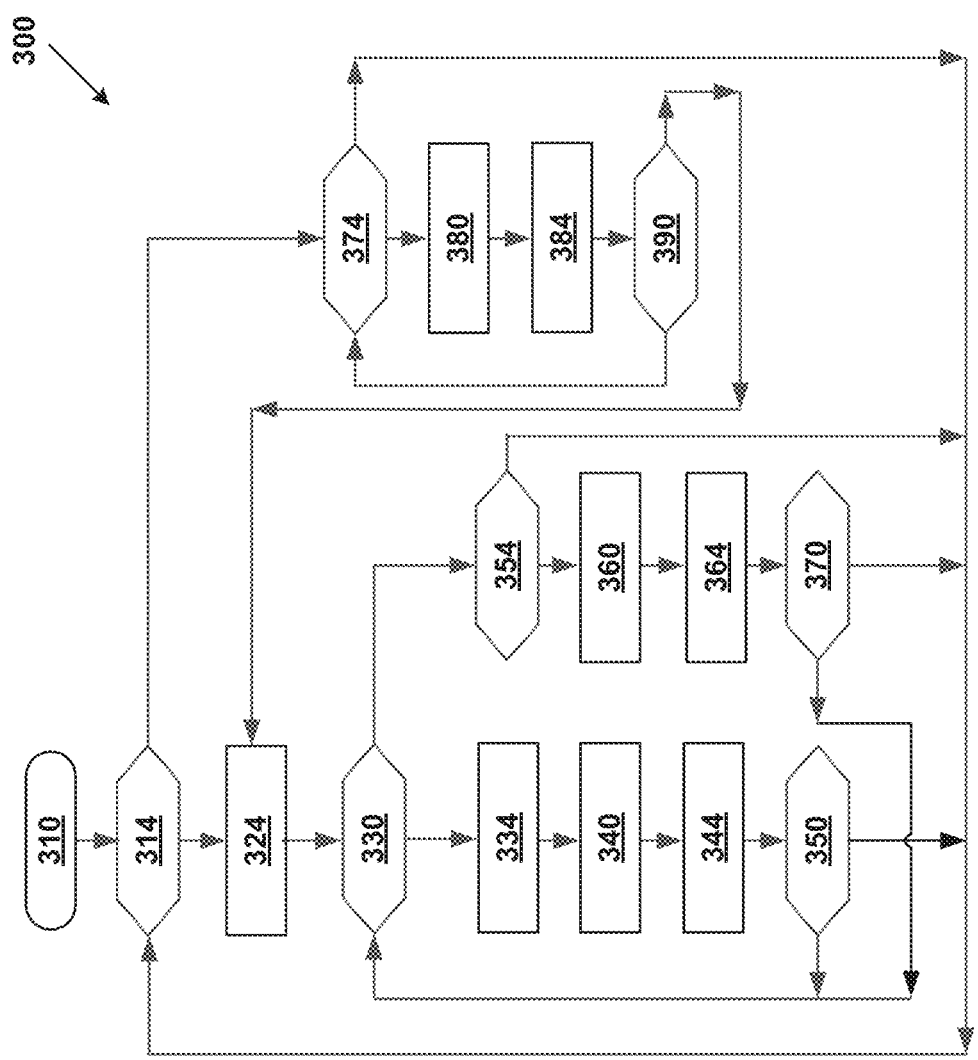
FIG. 3 is a simplified diagram showing a method for the multiport charging system as shown in FIG. 1 and FIG. 2 according to certain embodiments of the present disclosure.

FIG. 3 is a simplified diagram showing a method for the multiport charging system 100 as shown in FIG. 1 and FIG. 2 according to certain embodiments of the present disclosure. This diagram is merely an example, which should not unduly limit the scope of the claims. One of ordinary skill in the art would recognize many variations, alternatives, and modifications. The method 300 includes processes 310, 314, 324, 330, 334, 340, 344, 350, 354, 360, 364, 370, 374, 380, 384, and 390. For example, after the process 310 is performed, each DC-to-DC converter (e.g., the DC-to-DC converter 200) of the multiple DC-to-DC converters of the multiport charging system 100 performs the process 310, the process 314, the process 324, the process 330, the process 334, the process 340, the process 344, the process 350, the process 354, the process 360, the process 364, the process 370, the process 374, the process 380, the process 384, and/or the process 390. Although the above has been shown using a selected group of processes for the method 300, there can be many alternatives, modifications, and variations. For example, some of the processes may be expanded and/or combined. Other processes may be inserted to those noted above. Depending upon the embodiment, the sequence of processes may be interchanged with others replaced. Further details of these processes are found throughout the present specification.

At the process 310, the AC-to-DC converter 110 (e.g., an AC-to-DC switching regulator) is powered on so that the voltage 111 (e.g., VIN) is generated based at least in part on the voltage 109 according to some embodiments. For example, at the process 310, none of the multiple DC-to-DC converters of the multiport charging system 100 corresponds to a USB output port that is connected to a load, and for each DC-to-DC converter (e.g., the DC-to-DC converter 200) of the multiple DC-to-DC converters of the multiport charging system 100, its corresponding switches (e.g., the switches 230, 232, 234 and 236) are all open. As an example, at the process 310, for the DC-to-DC converter 200 (e.g., a DC-to-DC converter $120_K$, wherein K is an integer that is larger than or equal to 1 and smaller than or equal to N, and N is an integer larger than 1), all of the switches 230, 232, 234 and 236 are open. In certain examples, at the process 310, none of the multiple DC-to-DC converters of the multiport charging system 100 corresponds to a USB output port that is connected to a load, and each DC-to-DC converter (e.g., the DC-to-DC converter 200) of the multiple DC-to-DC converters of the multiport charging system 100 outputs a load detection current (e.g., the load detection current 227) that is equal to zero in magnitude. For example, at the process 310, the DC-to-DC converter 200 (e.g., a DC-to-DC converter $120_K$, wherein K is an integer that is larger than or equal to 1 and smaller than or equal to N, and N is an integer larger than 1) outputs the load detection current 227 that is equal to zero in magnitude. In some examples, at the process 310, the current that flows through the resistor 130 is equal to zero in magnitude, and the detection voltage 131 is equal to the ground voltage.

At the process 314, a DC-to-DC converter (e.g., the DC-to-DC converter 200) of the multiple DC-to-DC converters of the multiport charging system 100 detects whether its corresponding USB output port (e.g., the USB output port 290) becomes connected to any load according to certain embodiments. For example, at the process 314, the DC-to-DC converter 200 (e.g., a DC-to-DC converter $120_K$, wherein K is an integer that is larger than or equal to 1 and smaller than or equal to N, and N is an integer larger than 1) determines whether the USB output port 290 becomes connected to any load.

In some examples, at the process 314, for the DC-to-DC converter (e.g., the DC-to-DC converter 200), its corresponding switches (e.g., the switches 230, 232, 234 and 236) are all open. For example, at the process 314, for the DC-to-DC converter 200 (e.g., a DC-to-DC converter $120_K$, wherein K is an integer that is larger than or equal to 1 and smaller than or equal to N, and N is an integer larger than 1), all of the switches 230, 232, 234 and 236 are open. In certain examples, at the process 314, the DC-to-DC converter (e.g., the DC-to-DC converter 200) outputs a load detection current (e.g., the load detection current 227) that is equal to zero in magnitude. For example, at the process 314, the DC-to-DC converter 200 (e.g., a DC-to-DC converter $120_K$, wherein K is an integer that is larger than or equal to 1 and smaller than or equal to N, and N is an integer larger than 1) outputs the load detection current 227 that is equal to zero in magnitude.

In some examples, if, at the process 314, the DC-to-DC converter (e.g., the DC-to-DC converter 200) of the multiple DC-to-DC converters of the multiport charging system 100 detects that its corresponding USB output port (e.g., the USB output port 290) becomes connected to a load, the DC-to-DC converter (e.g., the DC-to-DC converter 200) performs the process 324. For example, if, at the process 314, the DC-to-DC converter 200 (e.g., a DC-to-DC converter $120_K$, wherein K is an integer that is larger than or equal to 1 and smaller than or equal to N, and N is an integer larger than 1) detects that the USB output port 290 becomes connected to a load, the DC-to-DC converter 200 performs the process 324. In certain examples, if, at the process 314, the DC-to-DC converter (e.g., the DC-to-DC converter 200) of the multiple DC-to-DC converters of the multiport charging system 100 detects that its corresponding USB output port (e.g., the USB output port 290) remains not connected to any load, the DC-to-DC converter (e.g., the DC-to-DC converter 200) performs the process 374. For example, if, at the process 314, the DC-to-DC converter 200 (e.g., a DC-to-DC converter $120_K$, wherein K is an integer that is larger than or equal to 1 and smaller than or equal to N, and N is an integer larger than 1) detects that the USB output port 290 remains not connected to any load, the DC-to-DC converter 200 performs the process 374.

At the process 324, the DC-to-DC converter (e.g., the DC-to-DC converter 200) of the multiple DC-to-DC converters of the multiport charging system 100 generates a reference voltage (e.g., the reference voltage $V_{REF}$) and a reference current (e.g., the reference current $I_{REF}$) for its corresponding USB output port (e.g., the USB output port 290), and generates a load detection current (e.g., the load detection current 227) that is larger than zero in magnitude according to some embodiments. For example, at the process 324, the DC-to-DC converter 200 (e.g., a DC-to-DC converter $120_K$, wherein K is an integer that is larger than or equal to 1 and smaller than or equal to N, and N is an integer larger than 1) obtains the load demand information for the USB output port 290, and the obtained load demand information includes a load demand voltage and/or a load demand current. As an example, at the process 324, based at least in part on the load demand information, the DC-to-DC converter 200 (e.g., a DC-to-DC converter $120_K$, wherein K is an integer that is larger than or equal to 1 and smaller than or equal to N, and N is an integer larger than 1) generates the reference voltage $V_{REF}$ and the reference current $I_{REF}$ for the USB output port 290, wherein the reference voltage $V_{REF}$ represents the load demand voltage for the USB output port 290 and the reference current $I_{REF}$ represents the load demand current for the USB output port 290. In certain examples, at the process 324, in response to its corresponding USB output port (e.g., the USB output port 290) being connected to a load, the DC-to-DC converter (e.g., the DC-to-DC converter 200) generates a load detection current (e.g., the load detection current 227) with a predetermined magnitude (e.g., $I_p$), wherein the predetermined magnitude (e.g., $I_p$) is larger than zero. For example, the load detection current (e.g., the load detection current 227) with the predetermined magnitude (e.g., $I_p$) flows through the resistor 130, wherein the predetermined magnitude (e.g., $I_p$) is larger than zero.

At the process 330, the DC-to-DC converter (e.g., the DC-to-DC converter 200) of the multiple DC-to-DC converters of the multiport charging system 100 receives the detection voltage 131 that is generated by the resistor 130, and determines whether the detection voltage 131 is equal to $I_p \times R$, wherein R represents the resistance of the resistor 130, $I_p$ represents the predetermined magnitude of the load detection current (e.g., the load detection current 227) when the corresponding USB output port (e.g., the USB output port 290) is connected to a load, and the predetermined magnitude is larger than zero according to certain embodiments. In some examples, if, at the process 330, the DC-to-DC converter (e.g., the DC-to-DC converter 200) determines that the detection voltage 131 is equal to $I_p \times R$, the DC-to-DC converter (e.g., the DC-to-DC converter 200) performs the process 334. In certain examples, if, at the process 330, the DC-to-DC converter (e.g., the DC-to-DC converter 200) determines that the detection voltage 131 is not equal to $I_p \times R$, the DC-to-DC converter (e.g., the DC-to-DC converter 200) performs the process 354.

At the process 334, the DC-to-DC converter (e.g., the DC-to-DC converter 200) of the multiple DC-to-DC converters of the multiport charging system 100 closes its three switches (e.g., the switches 230, 232 and 234) and keeps its other switch (e.g., the switch 236) open according to some embodiments. For example, at the process 334, for the DC-to-DC converter 200 (e.g., a DC-to-DC converter $120_K$, wherein K is an integer that is larger than or equal to 1 and smaller than or equal to N, and N is an integer larger than 1), all of the switches 230, 232, and 234 become closed, and the switch 236 remains open.

At the process 340, the DC-to-DC converter (e.g., the DC-to-DC converter 200) of the multiple DC-to-DC converters of the multiport charging system 100 uses its voltage/current generator (e.g., the voltage/current generator 202) to generate a voltage (e.g., the voltage 201) and a current (e.g., the current 203) according to certain embodiments. In some examples, at the process 340, the DC-to-DC converter 200 (e.g., a DC-to-DC converter $120_K$, wherein K is an integer that is larger than or equal to 1 and smaller than or equal to N, and N is an integer larger than 1) uses the voltage/current generator 202 to generate the voltage 201 and the current 203. For example, the voltage/current generator 202 includes the error amplifiers 272 and 274, the buffers 276 and 278, the comparator 296, and the switch controller 280. As an example, the voltage/current generator 202 also includes the capacitor 260, the inductive coil 270, the resistors 282, 284 and 286, and the inductive current sampling unit 294.

In some examples, at the process 340, the DC-to-DC converter (e.g., the DC-to-DC converter 200) of the multiple DC-to-DC converters of the multiport charging system 100 operates as a voltage-to-voltage converter, and based on at least information associated with the reference voltage (e.g., the reference voltage $V_{REF}$), its voltage/current generator (e.g., the voltage/current generator 202) generates the voltage (e.g., the voltage 201) based at least in part on the voltage 111 (e.g., VIN). For example, at the process 340, the DC-to-DC converter 200 (e.g., a DC-to-DC converter $120_K$, wherein K is an integer that is larger than or equal to 1 and smaller than or equal to N, and N is an integer larger than 1) operates as a voltage-to-voltage converter, and based on at least information associated with the reference voltage $V_{REF}$, the voltage/current generator 202 generates the voltage 201 based at least in part on the voltage 111 (e.g., VIN). In certain examples, the DC-to-DC converter (e.g., the DC-to-DC converter 200) of the multiple DC-to-DC converters of the multiport charging system 100 uses the generated voltage (e.g., the voltage 201) as an output voltage (e.g., the output voltage 221) for its corresponding USB output port (e.g., the USB output port 290) through a closed switch (e.g., the switch 230), and also uses the generated current (e.g., the current 203) as at least part of an output current (e.g., the output current 223) for its corresponding USB output port (e.g., the USB output port 290) through the closed switch (e.g., the switch 230). As an example, the DC-to-DC converter 200 uses the voltage 201 as the output voltage 221 for the USB output port 290 through the switch 230, and also uses the current 203 as at least part of the output current 223 for the USB output port 290 through the switch 230.

At the process 344, for the DC-to-DC converter (e.g., the DC-to-DC converter 200) of the multiple DC-to-DC converters of the multiport charging system 100, the one or more contributing currents generated by all other one or more DC-to-DC converters of the multiple DC-to-DC converters of the multiport charging system 100 flow from the contributing terminal (e.g., the contributing terminal 292) of the DC-to-DC converter (e.g., the DC-to-DC converter 200) to its corresponding USB output port (e.g., the USB output port 290) according to certain embodiments. As an example, at the process 344, for the DC-to-DC converter 200 (e.g., a DC-to-DC converter $120_K$, wherein K is an integer that is larger than or equal to 1 and smaller than or equal to N, and N is an integer larger than 1), the one or more contributing currents generated by all other one or more DC-to-DC converters of the multiple DC-to-DC converters of the multiport charging system 100 flow from the contributing terminal 292 of the DC-to-DC converter 200 through the switch 232 and the switch 230 to the USB output port 290.

In some examples, at the process 344, the DC-to-DC converter (e.g., the DC-to-DC converter 200) of the multiple DC-to-DC converters of the multiport charging system 100 uses the generated voltage (e.g., the voltage 201) as an output voltage (e.g., the output voltage 221) for its corresponding USB output port (e.g., the USB output port 290), and also uses the generated current (e.g., the current 203) and the one or more contributing currents generated by all other one or more DC-to-DC converters of the multiple DC-to-DC converters of the multiport charging system 100 as an output current (e.g., the output current 223) for its corresponding USB output port (e.g., the USB output port 290), wherein the output current (e.g., the output current 223) is equal to a sum of the generated current (e.g., the current 203) and the one or more contributing currents generated by all other one or more DC-to-DC converters of the multiple DC-to-DC converters of the multiport charging system 100. As an example, at the process 344, the DC-to-DC converter 200 uses the voltage 201 as the output voltage 221 for the USB output port 290, and also uses the current 203 and the one or more contributing currents generated by all other one or more DC-to-DC converters of the multiple DC-to-DC converters of the multiport charging system 100 as the output current 223 for the USB output port 290, wherein the output current 223 is equal to a sum of the current 203 and the one or more contributing currents generated by all other one or more DC-to-DC converters of the multiple DC-to-DC converters of the multiport charging system 100. In certain examples, the output voltage (e.g., the output voltage 221) and the output current (e.g., the output current 223) are used to charge the load that is connected to the corresponding USB output port (e.g., the USB output port 290). For example, the output voltage 221 and the output current 223 are used to charge the load that is connected to the USB output port 290.

At the process 350, the DC-to-DC converter (e.g., the DC-to-DC converter 200) of the multiple DC-to-DC converters of the multiport charging system 100 determines whether its corresponding USB output port (e.g., the USB output port 290) becomes disconnected from the load according to some embodiments. In certain examples, if, at the process 350, the DC-to-DC converter (e.g., the DC-to-DC converter 200) of the multiple DC-to-DC converters of the multiport charging system 100 determines that its corresponding USB output port (e.g., the USB output port 290) does not become disconnected from the load, the DC-to-DC converter (e.g., the DC-to-DC converter 200) performs the process 330. For example, if, at the process 350, the DC-to-DC converter 200 (e.g., a DC-to-DC converter $120_K$, wherein K is an integer that is larger than or equal to 1 and smaller than or equal to N, and N is an integer larger than 1) determines that the USB output port 290 is connected to the load, the DC-to-DC converter 200 performs the process 330. In some examples, if, at the process 350, the DC-to-DC converter (e.g., the DC-to-DC converter 200) of the multiple DC-to-DC converters of the multiport charging system 100 determines that its corresponding USB output port (e.g., the USB output port 290) becomes disconnected from the load, the DC-to-DC converter (e.g., the DC-to-DC converter 200) performs the process 314. For example, if, at the process 350, the DC-to-DC converter 200 (e.g., a DC-to-DC converter $120_K$, wherein K is an integer that is larger than or equal to 1 and smaller than or equal to N, and N is an integer larger than 1) determines that the USB output port 290 is not connected to the load, the DC-to-DC converter 200 performs the process 314.

At the process 354, the DC-to-DC converter (e.g., the DC-to-DC converter 200) of the multiple DC-to-DC converters of the multiport charging system 100 receives the detection voltage 131 that is generated by the resistor 130, and determines whether the detection voltage 131 is larger than or equal to $2 \times I_P \times R$, wherein R represents the resistance of the resistor 130, $I_P$ represents the predetermined magnitude of the load detection current (e.g., the load detection current 227) when the corresponding USB output port (e.g., the USB output port 290) is connected to a load, and the predetermined magnitude is larger than zero according to certain embodiments.

In some examples, because at the process 314, the DC-to-DC converter (e.g., the DC-to-DC converter 200) of the multiple DC-to-DC converters of the multiport charging system 100 detects that its corresponding USB output port (e.g., the USB output port 290) becomes connected to the load, so if at the process 354, the DC-to-DC converter (e.g., the DC-to-DC converter 200) of the multiple DC-to-DC converters of the multiport charging system 100 determines that the detection voltage 131 is larger than or equal to $2 \times I_P \times R$, then among all other one or more DC-to-DC converters of the multiple DC-to-DC converters of the multiport charging system 100, at least one DC-to-DC converter corresponds to a USB output port that is connected to a load. For example, because at the process 314, the DC-to-DC converter 200 detects that the USB output port 290 becomes connected to the load, so if at the process 354, the DC-to-DC converter 200 determines that the detection voltage 131 is larger than or equal to $2 \times I_P \times R$, then among all other one or more DC-to-DC converters of the multiple DC-to-DC converters of the multiport charging system 100, at least one DC-to-DC converter corresponds to a USB output port that is connected to a load.

In certain examples, because at the process 330, the DC-to-DC converter (e.g., the DC-to-DC converter 200) determines that the detection voltage 131 is not equal to $I_p \times R$, so if at the process 354, the DC-to-DC converter (e.g., the DC-to-DC converter 200) of the multiple DC-to-DC converters of the multiport charging system 100 determines that the detection voltage 131 is not larger than or equal to $2 \times I_p \times R$, then the detection voltage 131 is equal to the ground voltage, indicating the current that flows through the resistor 130 is equal to zero in magnitude. For example, because at the process 330, the DC-to-DC converter 200 determines that the detection voltage 131 is not equal to $I_p \times R$, so if at the process 354, the DC-to-DC converter 200 determines that the detection voltage 131 is not larger than or equal to $2 \times I_p \times R$, then the detection voltage 131 is equal to the ground voltage, indicating the current that flows through the resistor 130 is equal to zero in magnitude.

In certain examples, if, at the process 354, the DC-to-DC converter (e.g., the DC-to-DC converter 200) determines that the detection voltage 131 is larger than or equal to $2 \times I_p \times R$, then the DC-to-DC converter (e.g., the DC-to-DC converter 200) performs the process 360. In certain examples, if, at the process 354, the DC-to-DC converter (e.g., the DC-to-DC converter 200) determines that the detection voltage 131 is not larger than or equal to $2 \times I_p \times R$, then the DC-to-DC converter (e.g., the DC-to-DC converter 200) performs the process 314.

At the process 360, the DC-to-DC converter (e.g., the DC-to-DC converter 200) of the multiple DC-to-DC converters of the multiport charging system 100 closes its two switches (e.g., the switches 230 and 234) and keeps its other two switches (e.g., the switch 232 and 236) open according to some embodiments. For example, at the process 360, for the DC-to-DC converter 200 (e.g., a DC-to-DC converter $120_K$, wherein K is an integer that is larger than or equal to 1 and smaller than or equal to N, and N is an integer larger than 1), both of the switches 230 and 234 become closed, and both of the switches 232 and 236 remain open.

At the process 364, the DC-to-DC converter (e.g., the DC-to-DC converter 200) of the multiple DC-to-DC converters of the multiport charging system 100 uses its voltage/current generator (e.g., the voltage/current generator 202) to generate a voltage (e.g., the voltage 201) and a current (e.g., the current 203) according to certain embodiments. In some examples, at the process 364, the DC-to-DC converter 200 (e.g., a DC-to-DC converter $120_K$, wherein K is an integer that is larger than or equal to 1 and smaller than or equal to N, and N is an integer larger than 1) uses the voltage/current generator 202 to generate the voltage 201 and the current 203. For example, the voltage/current generator 202 includes the error amplifiers 272 and 274, the buffers 276 and 278, the comparator 296, and the switch controller 280. As an example, the voltage/current generator 202 also includes the capacitor 260, the inductive coil 270, the resistors 282, 284 and 286, and the inductive current sampling unit 294.

In some examples, at the process 364, the DC-to-DC converter (e.g., the DC-to-DC converter 200) of the multiple DC-to-DC converters of the multiport charging system 100 operates as a voltage-to-voltage converter, and based on at least information associated with the reference voltage (e.g., the reference voltage $V_{REF}$), its voltage/current generator (e.g., the voltage/current generator 202) generates the voltage (e.g., the voltage 201) based at least in part on the voltage 111 (e.g., VIN). For example, at the process 364, the DC-to-DC converter 200 (e.g., a DC-to-DC converter $120_K$, wherein K is an integer that is larger than or equal to 1 and smaller than or equal to N, and N is an integer larger than 1) operates as a voltage-to-voltage converter, and based on at least information associated with the reference voltage $V_{REF}$, the voltage/current generator 202 generates the voltage 201 based at least in part on the voltage 111 (e.g., VIN).

In certain examples, the DC-to-DC converter (e.g., the DC-to-DC converter 200) of the multiple DC-to-DC converters of the multiport charging system 100 uses the generated voltage (e.g., the voltage 201) as an output voltage (e.g., the output voltage 221) for its corresponding USB output port (e.g., the USB output port 290) through a closed switch (e.g., the switch 230), and also uses the generated current (e.g., the current 203), without any contributing current from any other DC-to-DC converter of the multiple DC-to-DC converters of the multiport charging system 100, as an output current (e.g., the output current 223) for its corresponding USB output port (e.g., the USB output port 290) through the closed switch (e.g., the switch 230), wherein the output current (e.g., the output current 223) for its corresponding USB output port (e.g., the USB output port 290) is equal to the generated current (e.g., the current 203). As an example, the DC-to-DC converter 200 uses the voltage 201 as the output voltage 221 for the USB output port 290 through the switch 230, and also uses the current 203, without any contributing current from any other DC-to-DC converter of the multiple DC-to-DC converters of the multiport charging system 100, as the output current 223 for the USB output port 290 through the switch 230, wherein the output current 223 for the USB output port 290 is equal to the current 203.

At the process 370, the DC-to-DC converter (e.g., the DC-to-DC converter 200) of the multiple DC-to-DC converters of the multiport charging system 100 determines whether its corresponding USB output port (e.g., the USB output port 290) becomes disconnected from the load according to some embodiments. In certain examples, if, at the process 370, the DC-to-DC converter (e.g., the DC-to-DC converter 200) of the multiple DC-to-DC converters of the multiport charging system 100 determines that its corresponding USB output port (e.g., the USB output port 290) does not become disconnected from the load, the DC-to-DC converter (e.g., the DC-to-DC converter 200) performs the process 330. For example, if, at the process 370, the DC-to-DC converter 200 (e.g., a DC-to-DC converter $120_K$, wherein K is an integer that is larger than or equal to 1 and smaller than or equal to N, and N is an integer larger than 1) determines that the USB output port 290 is connected to the load, the DC-to-DC converter 200 performs the process 330. In some examples, if, at the process 370, the DC-to-DC converter (e.g., the DC-to-DC converter 200) of the multiple DC-to-DC converters of the multiport charging system 100 determines that its corresponding USB output port (e.g., the USB output port 290) becomes disconnected from the load, the DC-to-DC converter (e.g., the DC-to-DC converter 200) performs the process 314. For example, if, at the process 370, the DC-to-DC converter 200 (e.g., a DC-to-DC converter $120_K$, wherein K is an integer that is larger than or equal to 1 and smaller than or equal to N, and N is an integer larger than 1) determines that the USB output port 290 is not connected to the load, the DC-to-DC converter 200 performs the process 314.

At the process 374, the DC-to-DC converter (e.g., the DC-to-DC converter 200) of the multiple DC-to-DC converters of the multiport charging system 100 outputs a load detection current (e.g., the load detection current 227) that is equal to zero in magnitude according to certain embodiments. In some examples, at the process 374, the DC-to-DC converter (e.g., the DC-to-DC converter 200) of the multiple DC-to-DC converters of the multiport charging system 100 receives the detection voltage 131 that is generated by the resistor 130, and determines whether the detection voltage 131 is equal to $I_p \times R$, wherein R represents the resistance of the resistor 130, $I_p$ represents a predetermined magnitude of a load detection current when a corresponding USB output port is connected to a load, and the predetermined magnitude is larger than zero. For example, at the process 374, the DC-to-DC converter 200 (e.g., a DC-to-DC converter $120_K$, wherein K is an integer that is larger than or equal to 1 and smaller than or equal to N, and N is an integer larger than 1) outputs the load detection current 227 that is equal to zero in magnitude. As an example, at the process 374, the DC-to-DC converter 200 (e.g., a DC-to-DC converter $120_K$, wherein K is an integer that is larger than or equal to 1 and smaller than or equal to N, and N is an integer larger than 1) receives the detection voltage 131 that is generated by the resistor 130, and determines whether the detection voltage 131 is equal to $I_p \times R$, wherein R represents the resistance of the resistor 130, $I_p$ represents a predetermined magnitude of a load detection current when a corresponding USB output port is connected to a load, and the predetermined magnitude is larger than zero.

In certain examples, because at the process 314, the DC-to-DC converter (e.g., the DC-to-DC converter 200) of the multiple DC-to-DC converters of the multiport charging system 100 detects that its corresponding USB output port (e.g., the USB output port 290) remains not connected to any load, so if at the process 374, the DC-to-DC converter (e.g., the DC-to-DC converter 200) determines that the detection voltage 131 is equal to $I_p \times R$, then among all other one or more DC-to-DC converters of the multiple DC-to-DC converters of the multiport charging system 100, only one DC-to-DC converter corresponds to a USB output port that is connected to a load. In some examples, because at the process 314, the DC-to-DC converter (e.g., the DC-to-DC converter 200) of the multiple DC-to-DC converters of the multiport charging system 100 detects that its corresponding USB output port (e.g., the USB output port 290) remains not connected to any load, so if at the process 374, the DC-to-DC converter (e.g., the DC-to-DC converter 200) determines that the detection voltage 131 is not equal to $I_p \times R$, then among all other one or more DC-to-DC converters of the multiple DC-to-DC converters of the multiport charging system 100, either no DC-to-DC converter corresponds to a USB output port that is connected to a load or at least two DC-to-DC converters each correspond to a USB output port that is connected to a load.

In certain examples, if, at the process 374, the DC-to-DC converter (e.g., the DC-to-DC converter 200) determines that the detection voltage 131 is equal to $I_p \times R$, the DC-to-DC converter (e.g., the DC-to-DC converter 200) performs the process 380. In some examples, if, at the process 374, the DC-to-DC converter (e.g., the DC-to-DC converter 200) determines that the detection voltage 131 is not equal to $I_p \times R$, the DC-to-DC converter (e.g., the DC-to-DC converter 200) performs the process 314.

At the process 380, the DC-to-DC converter (e.g., the DC-to-DC converter 200) of the multiple DC-to-DC converters of the multiport charging system 100 closes its two switches (e.g., the switches 232 and 236) and keeps its other two switches (e.g., the switches 230 and 234) open according to some embodiments. For example, at the process 380, for the DC-to-DC converter 200 (e.g., a DC-to-DC converter $120_K$, wherein K is an integer that is larger than or equal to 1 and smaller than or equal to N, and N is an integer larger than 1), both of the switches 232 and 236 become closed, and both of the switches 230 and 234 remain open.

At the process 384, the DC-to-DC converter (e.g., the DC-to-DC converter 200) of the multiple DC-to-DC converters of the multiport charging system 100 uses its voltage/current generator (e.g., the voltage/current generator 202) to generate a voltage (e.g., the voltage 201) and a current (e.g., the current 203) according to certain embodiments. In some examples, at the process 384, the DC-to-DC converter 200 (e.g., a DC-to-DC converter $120_K$, wherein K is an integer that is larger than or equal to 1 and smaller than or equal to N, and N is an integer larger than 1) uses the voltage/current generator 202 to generate the voltage 201 and the current 203. For example, the voltage/current generator 202 includes the error amplifiers 272 and 274, the buffers 276 and 278, the comparator 296, and the switch controller 280. As an example, the voltage/current generator 202 also includes the capacitor 260, the inductive coil 270, the resistors 282, 284 and 286, and the inductive current sampling unit 294.

In certain examples, at the process 384, the DC-to-DC converter (e.g., the DC-to-DC converter 200) of the multiple DC-to-DC converters of the multiport charging system 100 generates a reference voltage (e.g., the reference voltage $V_{REF}$) and a reference current (e.g., the reference current $I_{REF}$) based at least in part on the maximum output power of the DC-to-DC converter (e.g., the DC-to-DC converter 200). For example, at the process 384, the DC-to-DC converter 200 (e.g., a DC-to-DC converter $120_K$, wherein K is an integer that is larger than or equal to 1 and smaller than or equal to N, and N is an integer larger than 1) generates the reference voltage $V_{REF}$ and the reference current $I_{REF}$ based at least in part on the maximum output power of the DC-to-DC converter 200. As an example, the maximum output power of the DC-to-DC converter 200 (e.g., a DC-to-DC converter $120_K$) is the maximum output power of the voltage/current generator 202. For example, the maximum output power of the DC-to-DC converter 200 (e.g., a DC-to-DC converter $120_K$) is determined without taking into account any contributing current that is received by the DC-to-DC converter 200 and is generated by any other DC-to-DC converter.

In some examples, at the process 384, the DC-to-DC converter (e.g., the DC-to-DC converter 200) of the multiple DC-to-DC converters of the multiport charging system 100 operates as a voltage-to-current converter, and based on at least information associated with the reference current (e.g., the reference current $I_{REF}$), its voltage/current generator (e.g., the voltage/current generator 202) generates the current (e.g., the current 203) based at least in part on the voltage 111 (e.g., VIN). For example, at the process 384, the DC-to-DC converter 200 (e.g., a DC-to-DC converter $120_K$, wherein K is an integer that is larger than or equal to 1 and smaller than or equal to N, and N is an integer larger than 1) operates as a voltage-to-current converter, and based on at least information associated with the reference current $I_{REF}$, the voltage/current generator 202 generates the current 203 based at least in part on the voltage 111 (e.g., VIN).

In certain examples, at the process 384, the DC-to-DC converter (e.g., the DC-to-DC converter 200) of the multiple DC-to-DC converters of the multiport charging system 100 uses the generated current (e.g., the current 203) as a contributing current (e.g., the contributing current 229) that flows from its corresponding contributing terminal (e.g., the contributing terminal 292) to the only one DC-to-DC converter that corresponds to a USB output port connected to a load, wherein the only one DC-to-DC converter is among all other one or more DC-to-DC converters of the multiple DC-to-DC converters of the multiport charging system 100. For example, at the process 384, the DC-to-DC converter 200 (e.g., a DC-to-DC converter $120_K$, wherein K is an integer that is larger than or equal to 1 and smaller than or equal to N, and N is an integer larger than 1) uses the current 203 as the contributing current 229, wherein the current 203 flows through the switch 232 towards the contributing terminal 292, and the contributing current 229 flows from the contributing terminal 292 to the only one DC-to-DC converter that corresponds to a USB output port connected to a load.

In some examples, the only one DC-to-DC converter that corresponds to a USB output port connected to a load receives the contributing current (e.g., the contributing current 229) and uses the contributing current (e.g., the contributing current 229) as part of its output current to charge the load that is connected to the USB output port corresponding to the only one DC-to-DC converter. For example, the only one DC-to-DC converter that corresponds to a USB output port connected to a load receives the contributing current 229 and uses the contributing current 229 as part of its output current to charge the load that is connected to the USB output port corresponding to the only one DC-to-DC converter. As an example, the only one DC-to-DC converter that corresponds to a USB output port connected to a load uses its own voltage/current generator to generate a voltage as the output voltage of the only one DC-to-DC converter.

At the process 390, the DC-to-DC converter (e.g., the DC-to-DC converter 200) of the multiple DC-to-DC converters of the multiport charging system 100 determines whether its corresponding USB output port (e.g., the USB output port 290) becomes connected to any load according to some embodiments. In certain examples, if, at the process 390, the DC-to-DC converter (e.g., the DC-to-DC converter 200) of the multiple DC-to-DC converters of the multiport charging system 100 determines that its corresponding USB output port (e.g., the USB output port 290) does not become connected to any load, the DC-to-DC converter (e.g., the DC-to-DC converter 200) performs the process 374. For example, if, at the process 390, the DC-to-DC converter 200 (e.g., a DC-to-DC converter $120_K$, wherein K is an integer that is larger than or equal to 1 and smaller than or equal to N, and N is an integer larger than 1) determines that the USB output port 290 is not connected to any load, the DC-to-DC converter 200 performs the process 374. In some examples, if, at the process 390, the DC-to-DC converter (e.g., the DC-to-DC converter 200) of the multiple DC-to-DC converters of the multiport charging system 100 determines that its corresponding USB output port (e.g., the USB output port 290) becomes connected to a load, the DC-to-DC converter (e.g., the DC-to-DC converter 200) performs the process 324. For example, if, at the process 390, the DC-to-DC converter 200 (e.g., a DC-to-DC converter $120_K$, wherein K is an integer that is larger than or equal to 1 and smaller than or equal to N, and N is an integer larger than 1) determines that the USB output port 290 is connected to a load, the DC-to-DC converter 200 performs the process 324.

As mentioned above and further emphasized here, FIG. 3 is merely an example, which should not unduly limit the scope of the claims. One of ordinary skill in the art would recognize many variations, alternatives, and modifications. In certain examples, the process 354 is skipped, so that if, at the process 330, the DC-to-DC converter (e.g., the DC-to-DC converter 200) determines that the detection voltage 131 is not equal to $I_p \times R$, the DC-to-DC converter (e.g., the DC-to-DC converter 200) performs the process 360.

Figure 4:
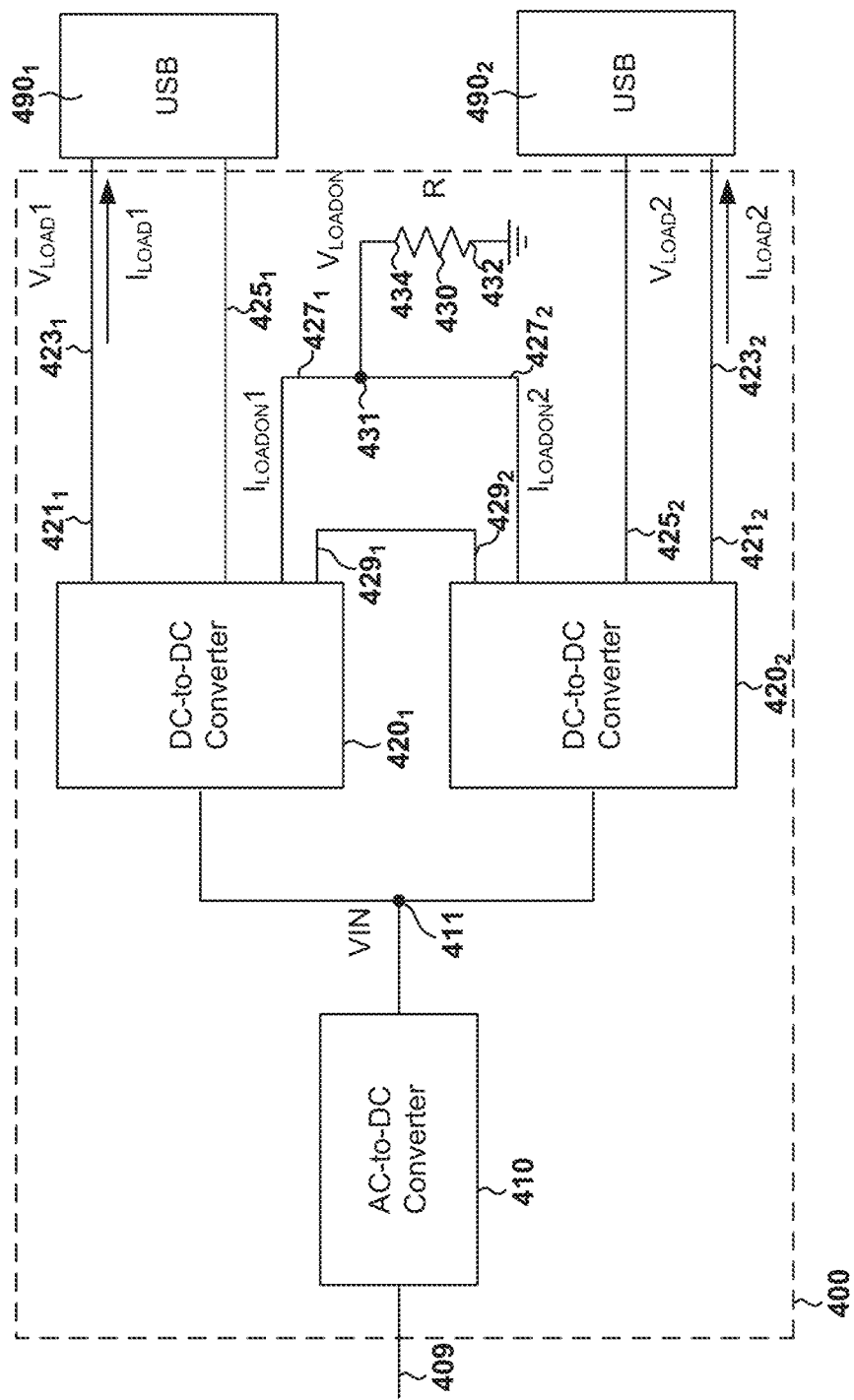
FIG. 4 is a simplified diagram showing a dual-port charging system according to certain embodiments of the present disclosure.

FIG. 4 is a simplified diagram showing a dual-port charging system according to certain embodiments of the present disclosure. This diagram is merely an example, which should not unduly limit the scope of the claims. One of ordinary skill in the art would recognize many variations, alternatives, and modifications. The dual-port charging system 400 (e.g., a dual-output switching regulator) includes an AC-to-DC converter 410 (e.g., an AC-to-DC switching regulator), multiple DC-to-DC converters (e.g., multiple DC-to-DC switching regulators), and a resistor 430, wherein the multiple DC-to-DC converters include a DC-to-DC converter $420_1$ and a DC-to-DC converter $420_2$. Although the above has been shown using a selected group of components for the multiport charging system, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

According to some embodiments, the AC-to-DC converter 410 (e.g., an AC-to-DC switching regulator) receives a voltage 409 (e.g., an input voltage) and generates a voltage 411 (e.g., VIN) based at least in part on the voltage 409. For example, the voltage 409 is an AC voltage. As an example, the voltage 411 (e.g., VIN) is a DC voltage. In certain examples, the voltage 411 (e.g., VIN) is received by each DC-to-DC converter of the multiple DC-to-DC converters. As an example, the voltage 411 (e.g., VIN) is received by the DC-to-DC converter $420_1$ and is also received by the DC-to-DC converter $420_2$.

In certain embodiments, the multiple DC-to-DC converters are connected to multiple USB output ports respectively. In some examples, the DC-to-DC converter $420_1$ is connected to a USB output port $490_1$, and the DC-to-DC converter $420_2$ is connected to a USB output port $490_2$. For example, the DC-to-DC converter $420_1$ corresponds to the USB output port $490_1$, and the DC-to-DC converter $420_2$ corresponds to the USB output port $490_2$. As an example, the USB output port $490_1$ corresponds to the DC-to-DC converter $420_1$, and the USB output port $490_2$ corresponds to the DC-to-DC converter $420_2$.

In some embodiments, the multiple DC-to-DC converters communicate with the multiple USB output ports using multiple communication signals respectively. For example, the DC-to-DC converter $420_1$ communicates with the USB output port $490_1$ using a communication signal $425_1$. As an example, the DC-to-DC converter $420_2$ communicates with the USB output port $490_2$ using a communication signal $425_2$. In certain examples, each DC-to-DC converter of the multiple DC-to-DC converters detects whether its corresponding USB output port is connected to any load. For example, the DC-to-DC converter $420_1$ detects whether or not the corresponding USB output port $490_1$ is connected to any load based at least in part on the communication signal $425_1$. As an example, the DC-to-DC converter $420_2$ detects whether or not the corresponding USB output port $490_2$ is connected to any load based at least in part on the communication signal $425_2$.

According to certain embodiments, the multiple DC-to-DC converters output multiple load detection currents based at least in part on the multiple communication signals respectively. In some examples, the multiple load detection currents include a load detection current $427_1$ and a load detection current $427_2$. For example, the load detection current $427_1$ is equal to or larger than zero in magnitude. As an example, the load detection current $427_2$ is equal to or larger than zero in magnitude. For example, if the communication signal $425_1$ indicates that the corresponding USB output port $490_1$ is connected to a load, the DC-to-DC converter $420_1$ outputs the load detection current $427_1$ that is larger than zero in magnitude. As an example, if the communication signal $425_1$ indicates that the corresponding USB output port $490_1$ is not connected to any load, the DC-to-DC converter $420_1$ outputs the load detection current $427_1$ that is equal to zero in magnitude. For example, if the communication signal $425_2$ indicates that the corresponding USB output port $490_2$ is connected to a load, the DC-to-DC converter $420_2$ outputs the load detection current $427_2$ that is larger than zero in magnitude. As an example, if the communication signal $425_2$ indicates that the corresponding USB output port $490_2$ is not connected to any load, the DC-to-DC converter $420_2$ outputs the load detection current $427_2$ that is equal to zero in magnitude.

According to some embodiments, the load detection current $427_1$ flows from the DC-to-DC converter $420_1$ through the resistor 430, and the load detection current $427_2$ flows from the DC-to-DC converter $420_2$ through the resistor 430, causing the resistor 430 to generate a detection voltage 431. In certain examples, the resistor 430 includes a resistor terminal 432 and a resistor terminal 434, wherein the resistor terminal 432 is biased to a ground voltage. In some examples, the detection voltage 431 is received by the DC-to-DC converter $420_1$, which uses the detection voltage 431 to determine how many one or more USB output ports of the multiple USB output ports each are connected to a load. In certain examples, the detection voltage 431 is received by the DC-to-DC converter $420_2$, which uses the detection voltage 431 to determine how many one or more USB output ports of the multiple USB output ports each are connected to a load. For example, neither the USB output port $490_1$ nor the USB output port $490_2$ is connected to a load. As an example, only one port of the USB output port $490_1$ and the USB output port $490_2$ is connected to a load. For example, the USB output port $490_1$ is connected to a load, and the USB output port $490_2$ is also connected to a load.

In certain embodiments, the multiple DC-to-DC converters are configured to output one or more output voltages and one or more output currents to one or more USB output ports that are connected to one or more loads respectively. For example, the DC-to-DC converter $420_1$ outputs an output voltage $421_1$ and an output current $423_1$ to the USB output port $490_1$ if the USB output port $490_1$ is connected to a load. As an example, the DC-to-DC converter $420_2$ outputs an output voltage $421_2$ and an output current $423_2$ to the USB output port $490_2$ if the USB output port $490_2$ is connected to a load.

According to some embodiments, if the USB output port $490_1$ corresponding to the DC-to-DC converter $420_1$ is connected to a load but the USB output port $490_2$ corresponding to the DC-to-DC converter $420_2$ is not connected to any load, the DC-to-DC converter $420_1$ operates as a voltage-to-voltage converter and generates the output voltage $421_1$ for the corresponding USB output port $490_1$. For example, the voltage 411 (e.g., VIN) is a DC voltage, and the output voltage $421_1$ is also a DC voltage. In certain examples, if the USB output port $490_1$ corresponding to the DC-to-DC converter $420_1$ is connected to a load but the USB output port $490_2$ corresponding to the DC-to-DC converter $420_2$ is not connected to any load, the DC-to-DC converter $420_2$ operates as a voltage-to-current converter and generates a contributing current $429_2$ for the DC-to-DC converter $420_1$. For example, the DC-to-DC converter $420_2$ operates as a voltage-to-current converter, and converts the voltage 411 (e.g., VIN) to the contributing current $429_2$. As an example, the voltage 411 (e.g., VIN) is a DC voltage, and the contributing current $429_2$ is a DC current. In some examples, if the USB output port $490_1$ corresponding to the DC-to-DC converter $420_1$ is connected to a load but the USB output port $490_2$ corresponding to the DC-to-DC converter $420_2$ is not connected to any load, the DC-to-DC converter $420_1$ receives and uses the contributing current $429_2$ as part of the output current $423_1$.

According to certain embodiments, if the USB output port $490_2$ corresponding to the DC-to-DC converter $420_2$ is connected to a load but the USB output port $490_1$ corresponding to the DC-to-DC converter $420_1$ is not connected to any load, the DC-to-DC converter $420_2$ operates as a voltage-to-voltage converter and generates the output voltage $421_2$ for the corresponding USB output port $490_2$. For example, the voltage 411 (e.g., VIN) is a DC voltage, and the output voltage $421_2$ is also a DC voltage. In some examples, if the USB output port $490_2$ corresponding to the DC-to-DC converter $420_2$ is connected to a load but the USB output port $490_1$ corresponding to the DC-to-DC converter $420_1$ is not connected to any load, the DC-to-DC converter $420_1$ operates as a voltage-to-current converter and generates a contributing current $429_1$ for the DC-to-DC converter $420_2$. For example, the DC-to-DC converter $420_1$ operates as a voltage-to-current converter, and converts the voltage 411 (e.g., VIN) to the contributing current $429_1$. As an example, the voltage 411 (e.g., VIN) is a DC voltage, and the contributing current $429_1$ is a DC current. In certain examples, if the USB output port $490_1$ corresponding to the DC-to-DC converter $420_1$ is connected to a load but the USB output port $490_2$ corresponding to the DC-to-DC converter $420_2$ is not connected to any load, the DC-to-DC converter $420_1$ receives and uses the contributing current $429_2$ as part of the output current $423_1$.

As shown in FIG. 4, the dual-port charging system 400 is the multiport charging system 100 with N equal to 2 according to some embodiments. For example, the AC-to-DC converter 410 is the AC-to-DC converter 110. In certain examples, the DC-to-DC converter $420_1$ is the DC-to-DC converter $120_1$, and the DC-to-DC converter $420_2$ is the DC-to-DC converter $120_2$. In some examples, the USB output port $490_1$ is the USB output port $190_1$, and the USB output port $490_2$ is the USB output port $190_2$. For example, the voltage 409 is the voltage 109. As an example, the voltage 411 is the voltage 111.

In certain examples, the contributing current $429_1$ is the contributing current $129_1$, and the contributing current $429_2$ is the contributing current $129_2$. For example, the output voltage $421_1$ is the output voltage $121_1$, and the output voltage $421_2$ is the output voltage $121_2$. As an example, the output current $423_1$ is the output current $123_1$, and the output current $423_2$ is the output current $123_2$. In some examples, the resistor 430 is the resistor 130, and the detection voltage 431 is the detection voltage 131. For example, the resistor terminal 432 is the resistor terminal 132. As an example, the resistor terminal 434 is the resistor terminal 134. In certain examples, the communication signal $425_1$ is the communication signal $125_1$, and the communication signal $425_2$ is the communication signal $125_2$. In some examples, the load detection current $427_1$ is the load detection current $127_1$, and the load detection current $427_2$ is the load detection current $127_2$.

As shown in FIG. 4, the DC-to-DC converter $420_1$ is a DC-to-DC converter 200 as shown in FIG. 2, and the DC-to-DC converter $420_2$ is another DC-to-DC converter 200 as shown in FIG. 2 according to certain embodiments. For example, the DC-to-DC converter $420_1$ includes a voltage/current generator (e.g., the voltage/current generator 202). As an example, the DC-to-DC converter $420_2$ includes a voltage/current generator (e.g., the voltage/current generator 202).

In some embodiments, the maximum output power for the voltage/current generator of the DC-to-DC converter $420_1$ is equal to 32.5 watts, and the maximum output power for the voltage/current generator of the DC-to-DC converter $420_2$ is also equal to 32.5 watts. For example, the maximum output power of the DC-to-DC converter $420_1$ is the maximum output power of its voltage/current generator (e.g., a voltage/current generator 202), without taking into account any contributing current that is received by the DC-to-DC converter $420_1$ and is generated by the DC-to-DC converter $420_2$. As an example, the maximum output power of the DC-to-DC converter $420_2$ is the maximum output power of its voltage/current generator (e.g., a voltage/current generator 202), without taking into account any contributing current that is received by the DC-to-DC converter $420_2$ and is generated by the DC-to-DC converter $420_1$. In certain examples, if only one port of the USB output port $490_1$ and the USB output port $490_2$ is connected to a load, the maximum output power for the DC-to-DC converter (e.g., the DC-to-DC converter $420_1$ or the DC-to-DC converter $420_2$) that corresponds to the only USB port (e.g., the USB output port $490_1$ or the USB output port $490_2$) connected to a load is equal to 65 watts, which is the sum of 32.5 watts and 32.5 watts. In some examples, if the USB output port $490_1$ and the USB output port $490_2$ each are connected to a load, the maximum output power for the USB output port $490_1$ is equal to 32.5 watts, and the maximum output power for the USB output port $490_2$ is also equal to 32.5 watts.

In certain embodiments, the maximum output power for the voltage/current generator of the DC-to-DC converter $420_1$ is equal to 20 watts, and the maximum output power for the voltage/current generator of the DC-to-DC converter $420_2$ is also equal to 45 watts. For example, the maximum output power of the DC-to-DC converter $420_1$ is the maximum output power of its voltage/current generator (e.g., a voltage/current generator 202), without taking into account any contributing current that is received by the DC-to-DC converter $420_1$ and is generated by the DC-to-DC converter $420_2$. As an example, the maximum output power of the DC-to-DC converter $420_2$ is the maximum output power of its voltage/current generator (e.g., a voltage/current generator 202), without taking into account any contributing current that is received by the DC-to-DC converter $420_2$ and is generated by the DC-to-DC converter $420_1$. For example, if only one port of the USB output port $490_1$ and the USB output port $490_2$ is connected to a load, the maximum output power for the DC-to-DC converter (e.g., the DC-to-DC converter $420_1$ or the DC-to-DC converter $420_2$) that corresponds to the only USB port (e.g., the USB output port $490_1$ or the USB output port $490_2$) connected to a load is equal to 65 watts, which is the sum of 20 watts and 45 watts. As an example, if the USB output port $490_1$ and the USB output port $490_2$ each are connected to a load, the maximum output power for the USB output port $490_1$ is equal to 20 watts, and the maximum output power for the USB output port $490_2$ is equal to 45 watts.

According to some embodiments, a DC-to-DC converter for a multiport charging system, the multiport charging system including a plurality of output ports that correspond to a plurality of DC-to-DC converters respectively, the plurality of DC-to-DC converters including the DC-to-DC converter, the plurality of output ports including a first output port that corresponds to the DC-to-DC converter, the DC-to-DC converter including: a load detector configured to: detect whether the first output port that corresponds to the DC-to-DC converter is connected to any load; and among the plurality of output ports, determine a first number of one or more output ports that are connected to one or more loads respectively; and a generator configured to: if the first output port that corresponds to the DC-to-DC converter is connected to a load, generate a first voltage as an output voltage for the first output port, the output voltage being equal to the first voltage; and if the first output port that corresponds to the DC-to-DC converter is not connected to any load and, among the plurality of output ports, only a second output port is connected to a load, generate a contributing current for only the second output port. For example, the DC-to-DC converter is implemented according to at least FIG. 1, FIG. 2, FIG. 3, and/or FIG. 4. As an example, the first number is equal to zero. For example, the first number is equal to one. As an example, the first number is larger than one.

For example, the load detector is further configured to: if the first output port that corresponds to the DC-to-DC converter is connected to a load, generate a load detection current with a predetermined magnitude that is larger than zero; and if the first output port that corresponds to the DC-to-DC converter is not connected to any load, generate the load detection current that is equal to zero in magnitude. As an example, the load detector is further configured to: receive a detection voltage from a resistor configured to receive a plurality of load detection currents from the plurality of DC-to-DC converters respectively; wherein the plurality of load detection currents include the load detection current; wherein: the plurality of load detection currents correspond to a plurality of magnitudes respectively; and each magnitude of the plurality of magnitudes is equal to zero or is equal to the predetermined magnitude that is larger than zero. For example, the load detector is further configured to, among the plurality of output ports, determine the first number of one or more output ports that are connected to one or more loads respectively based at least in part on the detection voltage. As an example, the load detector is further configured to, among the plurality of output ports, other than the first output port, determine a second number of one or more output ports that are connected to one or more loads respectively. For example, if the first output port that corresponds to the DC-to-DC converter is connected to a load, the load detector is further configured to determine the second number to be equal to the first number subtracted by one. As an example, if the first output port that corresponds to the DC-to-DC converter is connected to a load and the second number is equal to zero, the DC-to-DC converter is configured to receive one or more contributing currents from the plurality of output ports other than the first output port; and the generator is further configured to generate a first current as part of an output current for the first output port; wherein the output current is equal to a sum of the first current and the one or more contributing currents. For example, if the first output port that corresponds to the DC-to-DC converter is connected to a load and the second number is equal to or larger than one, the generator is further configured to generate a first current as an output current for the first output port; wherein the output current is equal to the first current. As an example, if the first output port that corresponds to the DC-to-DC converter is not connected to any load, the load detector is further configured to determine the second number to be equal to the first number, the second number being equal to one or being equal to zero or larger than one. For example, if the first output port that corresponds to the DC-to-DC converter is not connected to any load and the second number is equal to one, among the plurality of output ports, only the second output port is connected to a load. As an example, if the first output port that corresponds to the DC-to-DC converter is not connected to any load and the second number is equal to zero or larger than one, the generator is further configured not to generate any contributing current for any output port of the plurality of output ports.

For example, if the first output port that corresponds to the DC-to-DC converter is connected to a load, the generator is further configured to: receive a second voltage; and generate the first voltage based at least in part on the second voltage. As an example, wherein, if the first output port that corresponds to the DC-to-DC converter is connected to a load, the DC-to-DC converter is configured to operate as a voltage-to-voltage converter. For example, if the first output port that corresponds to the DC-to-DC converter is not connected to any load and, among the plurality of output ports, only the second output port is connected to a load, the generator is further configured to: receive a second voltage; and generate the contributing current based at least in part on the second voltage. As an example, if the first output port that corresponds to the DC-to-DC converter is not connected to any load and, among the plurality of output ports, only the second output port is connected to a load, the DC-to-DC converter is configured to operate as a voltage-to-current converter.

According to certain embodiments, a multiport charging system includes: an AC-to-DC converter configured to receive an input voltage and generate a converter voltage based at least in part on the input voltage; a plurality of DC-to-DC converters including a first DC-to-DC converter and a second DC-to-DC converter and configured to receive the converter voltage; a plurality of output ports that correspond to the plurality of DC-to-DC converters respectively, the plurality of output ports including a first output port that corresponds to the first DC-to-DC converter and further including a second output port that corresponds to the second DC-to-DC converter; and a resistor connected to each converter of the plurality of DC-to-DC converters; wherein the first DC-to-DC converter includes: a load detector configured to: detect whether the first output port that corresponds to the first DC-to-DC converter is connected to any load; and among the plurality of output ports, determine a first number of one or more output ports that are connected to one or more loads respectively; and a generator configured to: if the first output port that corresponds to the first DC-to-DC converter is connected to a load, generate a first voltage as an output voltage for the first output port, the output voltage being equal to the first voltage; and if the first output port that corresponds to the first DC-to-DC converter is not connected to any load and, among the plurality of output ports, only the second output port is connected to a load, generate a contributing current for only the second output port. For example, the multiport charging system is implemented according to at least FIG. 1, FIG. 2, FIG. 3, and/or FIG. 4. As an example, the input voltage is an AC voltage; and the converter voltage is a DC voltage.

For example, the load detector is further configured to: if the first output port that corresponds to the first DC-to-DC converter is connected to a load, generate a load detection current with a predetermined magnitude that is larger than zero; and if the first output port that corresponds to the first DC-to-DC converter is not connected to any load, generate the load detection current that is equal to zero in magnitude. As an example, the load detector is further configured to: receive a detection voltage from the resistor configured to receive a plurality of load detection currents from the plurality of DC-to-DC converters respectively; wherein the plurality of load detection currents include the load detection current; wherein: the plurality of load detection currents correspond to a plurality of magnitudes respectively; and each magnitude of the plurality of magnitudes is equal to zero or is equal to the predetermined magnitude that is larger than zero. For example, the load detector is further configured to, among the plurality of output ports, determine the first number of one or more output ports that are connected to one or more loads respectively based at least in part on the detection voltage. As an example, the load detector is further configured to, among the plurality of output ports, other than the first output port, determine a second number of one or more output ports that are connected to one or more loads respectively. For example, if the first output port that corresponds to the first DC-to-DC converter is connected to a load, the load detector is further configured to determine the second number to be equal to the first number subtracted by one, the second number being equal to zero or being equal to or larger than one. As an example, if the first output port that corresponds to the first DC-to-DC converter is connected to a load and the second number is equal to zero, the first DC-to-DC converter is configured to receive one or more contributing currents from the plurality of output ports other than the first output port; and the generator is further configured to generate a first current as part of an output current for the first output port; wherein the output current is equal to a sum of the first current and the one or more contributing currents. For example, if the first output port that corresponds to the first DC-to-DC converter is connected to a load and the second number is equal to or larger than one, the generator is further configured to generate a first current as an output current for the first output port; wherein the output current is equal to the first current. As an example, if the first output port that corresponds to the first DC-to-DC converter is not connected to any load, the load detector is further configured to determine the second number to be equal to the first number, the second number being equal to one or being equal to zero or larger than one. For example, if the first output port that corresponds to the first DC-to-DC converter is not connected to any load and the second number is equal to one, among the plurality of output ports, only the second output port is connected to a load. As an example, if the first output port that corresponds to the first DC-to-DC converter is not connected to any load and the second number is equal to zero or larger than one, the generator is further configured not to generate any contributing current for any output port of the plurality of output ports.

For example, if the first output port that corresponds to the first DC-to-DC converter is connected to a load, the generator is further configured to: receive the converter voltage; and generate the first voltage based at least in part on the converter voltage. As an example, if the first output port that corresponds to the first DC-to-DC converter is connected to a load, the first DC-to-DC converter is configured to operate as a voltage-to-voltage converter. For example, if the first output port that corresponds to the first DC-to-DC converter is not connected to any load and, among the plurality of output ports, only the second output port is connected to a load, the generator is further configured to: receive the converter voltage; and generate the contributing current based at least in part on the converter voltage. As an example, if the first output port that corresponds to the first DC-to-DC converter is not connected to any load and, among the plurality of output ports, only the second output port is connected to a load, the DC-to-DC converter is configured to operate as a voltage-to-current converter. For example, the plurality of output ports further include one or more additional output ports.

According to some embodiments, a method for a DC-to-DC converter of a multiport charging system, the multiport charging system including a plurality of output ports that correspond to a plurality of DC-to-DC converters respectively, the plurality of DC-to-DC converters including the DC-to-DC converter, the plurality of output ports including a first output port that corresponds to the DC-to-DC converter, the method including: detecting whether the first output port that corresponds to the DC-to-DC converter is connected to any load; determining, among the plurality of output ports, a first number of one or more output ports that are connected to one or more loads respectively; generating a first voltage as an output voltage for the first output port if the first output port that corresponds to the DC-to-DC converter is connected to a load, the output voltage being equal to the first voltage; and generating a contributing current for only a second output port if the first output port that corresponds to the DC-to-DC converter is not connected to any load and, among the plurality of output ports, only the second output port is connected to a load. For example, the method is implemented according to at least FIG. 1, FIG. 2, FIG. 3, and/or FIG. 4.

As an example, the method further includes: if the first output port that corresponds to the DC-to-DC converter is connected to a load, generating a load detection current with a predetermined magnitude that is larger than zero; and if the first output port that corresponds to the DC-to-DC converter is not connected to any load, generating the load detection current that is equal to zero in magnitude. For example, the method further includes: receiving a detection voltage from a resistor configured to receive a plurality of load detection currents from the plurality of DC-to-DC converters respectively; wherein the plurality of load detection currents include the load detection current; wherein: the plurality of load detection currents correspond to a plurality of magnitudes respectively; and each magnitude of the plurality of magnitudes is equal to zero or is equal to the predetermined magnitude that is larger than zero. As an example, the determining, among the plurality of output ports, a first number of one or more output ports that are connected to one or more loads respectively comprises: determining, among the plurality of output ports, the first number of one or more output ports that are connected to one or more loads respectively based at least in part on the detection voltage. For example, the method further includes: determining, among the plurality of output ports, other than the first output port, a second number of one or more output ports that are connected to one or more loads respectively. As an example, the determining, among the plurality of output ports, other than the first output port, a second number of one or more output ports that are connected to one or more loads respectively includes: if the first output port that corresponds to the DC-to-DC converter is connected to a load, determining the second number to be equal to the first number subtracted by one, the second number being equal to zero or being equal to or larger than one. For example, the method further includes: if the first output port that corresponds to the DC-to-DC converter is connected to a load and the second number is equal to zero, receiving one or more contributing currents from the plurality of output ports other than the first output port; and generating a first current as part of an output current for the first output port; wherein the output current is equal to a sum of the first current and the one or more contributing currents. As an example, the method further includes: if the first output port that corresponds to the DC-to-DC converter is connected to a load and the second number is equal to or larger than one, the generator is further configured to generate a first current as an output current for the first output port; wherein the output current is equal to the first current. For example, the determining, among the plurality of output ports, other than the first output port, a second number of one or more output ports that are connected to one or more loads respectively includes: if the first output port that corresponds to the DC-to-DC converter is not connected to any load, determining the second number to be equal to the first number, the second number being equal to one or being equal to zero or larger than one. As an example, if the first output port that corresponds to the DC-to-DC converter is not connected to any load and the second number is equal to one, among the plurality of output ports, only the second output port is connected to a load.

For example, the generating a first voltage as an output voltage for the first output port if the first output port that corresponds to the DC-to-DC converter is connected to a load includes: if the first output port that corresponds to the DC-to-DC converter is connected to a load, receiving a second voltage; and generating the first voltage based at least in part on the second voltage. As an example, the generating a contributing current for only a second output port if the first output port that corresponds to the DC-to-DC converter is not connected to any load and, among the plurality of output ports, only the second output port is connected to a load includes: if the first output port that corresponds to the DC-to-DC converter is not connected to any load and, among the plurality of output ports, only the second output port is connected to a load, receiving a second voltage; and generating the contributing current based at least in part on the second voltage.

According to certain embodiments, a method for a multiport charging system includes: receiving an input voltage; generating a converter voltage based at least in part on the input voltage; receiving the converter voltage by a plurality of DC-to-DC converters including a first DC-to-DC converter and a second DC-to-DC converter, the plurality of DC-to-DC converters corresponding to a plurality of output ports respectively, the plurality of output ports including a first output port that corresponds to the first DC-to-DC converter and further including a second output port that corresponds to the second DC-to-DC converter; detecting whether the first output port that corresponds to the first DC-to-DC converter is connected to any load; determining, among the plurality of output ports, a first number of one or more output ports that are connected to one or more loads respectively; generating a first voltage as an output voltage for the first output port if the first output port that corresponds to the first DC-to-DC converter is connected to a load, the output voltage being equal to the first voltage; and generating a contributing current for only the second output port if the first output port that corresponds to the DC-to-DC converter is not connected to any load and, among the plurality of output ports, only the second output port is connected to a load. For example, the method is implemented according to at least FIG. 1, FIG. 2, FIG. 3, and/or FIG. 4. As an example, the input voltage is an AC voltage; and the converter voltage is a DC voltage. For example, the first number is equal to zero. As an example, the first number is equal to one. For example, the first number is larger than one.

For example, some or all components of various embodiments of the present disclosure each are, individually and/or in combination with at least another component, implemented using one or more software components, one or more hardware components, and/or one or more combinations of software and hardware components. As an example, some or all components of various embodiments of the present disclosure each are, individually and/or in combination with at least another component, implemented in one or more circuits, such as one or more analog circuits and/or one or more digital circuits. For example, various embodiments and/or examples of the present disclosure can be combined.

Although specific embodiments of the present disclosure have been described, it will be understood by those of skill in the art that there are other embodiments that are equivalent to the described embodiments. Accordingly, it is to be understood that the invention is not to be limited by the specific illustrated embodiments.

What is claimed is:

1. A DC-to-DC converter for a multiport charging system, the multiport charging system including a plurality of output ports that correspond to a plurality of DC-to-DC converters respectively, the plurality of DC-to-DC converters including the DC-to-DC converter, the plurality of output ports including a first output port that corresponds to the DC-to-DC converter, the DC-to-DC converter comprising:
    a load detector configured to:
        detect whether the first output port that corresponds to the DC-to-DC converter is connected to any load; and
        among the plurality of output ports, determine a first number of one or more output ports that are connected to one or more loads respectively; and
    a generator configured to:
        if the first output port that corresponds to the DC-to-DC converter is connected to a load, generate a first voltage as an output voltage for the first output port, the output voltage being equal to the first voltage; and
        if the first output port that corresponds to the DC-to-DC converter is not connected to any load and, among the plurality of output ports, only a second output port is connected to a load, generate a contributing current for only the second output port.

2. The DC-to-DC converter of claim 1 wherein the first number is equal to zero.

3. The DC-to-DC converter of claim 1 wherein the first number is equal to one.

4. The DC-to-DC converter of claim 1 wherein the first number is larger than one.

5. The DC-to-DC converter of claim 1 wherein the load detector is further configured to:
    if the first output port that corresponds to the DC-to-DC converter is connected to a load, generate a load detection current with a predetermined magnitude that is larger than zero; and
    if the first output port that corresponds to the DC-to-DC converter is not connected to any load, generate the load detection current that is equal to zero in magnitude.

6. The DC-to-DC converter of claim 5 wherein the load detector is further configured to:
    receive a detection voltage from a resistor configured to receive a plurality of load detection currents from the plurality of DC-to-DC converters respectively;
    wherein the plurality of load detection currents include the load detection current;
    wherein:
        the plurality of load detection currents correspond to a plurality of magnitudes respectively; and
        each magnitude of the plurality of magnitudes is equal to zero or is equal to the predetermined magnitude that is larger than zero.

7. The DC-to-DC converter of claim 6 wherein the load detector is further configured to, among the plurality of output ports, determine the first number of one or more output ports that are connected to one or more loads respectively based at least in part on the detection voltage.

8. The DC-to-DC converter of claim 7 wherein the load detector is further configured to, among the plurality of output ports, other than the first output port, determine a second number of one or more output ports that are connected to one or more loads respectively.

9. The DC-to-DC converter of claim 8 wherein, if the first output port that corresponds to the DC-to-DC converter is connected to a load, the load detector is further configured to determine the second number to be equal to the first number subtracted by one.

10. The DC-to-DC converter of claim 9 wherein, if the first output port that corresponds to the DC-to-DC converter is connected to a load and the second number is equal to zero,
    the DC-to-DC converter is configured to receive one or more contributing currents from the plurality of output ports other than the first output port; and
    the generator is further configured to generate a first current as part of an output current for the first output port;
    wherein the output current is equal to a sum of the first current and the one or more contributing currents.

11. The DC-to-DC converter of claim 9 wherein, if the first output port that corresponds to the DC-to-DC converter is connected to a load and the second number is equal to or larger than one,
    the generator is further configured to generate a first current as an output current for the first output port;
    wherein the output current is equal to the first current.

12. The DC-to-DC converter of claim 8 wherein, if the first output port that corresponds to the DC-to-DC converter is not connected to any load, the load detector is further configured to determine the second number to be equal to the first number, the second number being equal to one or being equal to zero or larger than one.

13. The DC-to-DC converter of claim 12 wherein, if the first output port that corresponds to the DC-to-DC converter is not connected to any load and the second number is equal to one, among the plurality of output ports, only the second output port is connected to a load.

14. The DC-to-DC converter of claim 12 wherein, if the first output port that corresponds to the DC-to-DC converter is not connected to any load and the second number is equal to zero or larger than one, the generator is further configured not to generate any contributing current for any output port of the plurality of output ports.

15. The DC-to-DC converter of claim 1 wherein, if the first output port that corresponds to the DC-to-DC converter is connected to a load, the generator is further configured to:
receive a second voltage; and
generate the first voltage based at least in part on the second voltage.

16. The DC-to-DC converter of claim 15 wherein, if the first output port that corresponds to the DC-to-DC converter is connected to a load, the DC-to-DC converter is configured to operate as a voltage-to-voltage converter.

17. The DC-to-DC converter of claim 1 wherein, if the first output port that corresponds to the DC-to-DC converter is not connected to any load and, among the plurality of output ports, only the second output port is connected to a load, the generator is further configured to:
receive a second voltage; and
generate the contributing current based at least in part on the second voltage.

18. The DC-to-DC converter of claim 17 wherein, if the first output port that corresponds to the DC-to-DC converter is not connected to any load and, among the plurality of output ports, only the second output port is connected to a load, the DC-to-DC converter is configured to operate as a voltage-to-current converter.

19. A multiport charging system comprising:
an AC-to-DC converter configured to receive an input voltage and generate a converter voltage based at least in part on the input voltage;
a plurality of DC-to-DC converters including a first DC-to-DC converter and a second DC-to-DC converter and configured to receive the converter voltage;
a plurality of output ports that correspond to the plurality of DC-to-DC converters respectively, the plurality of output ports including a first output port that corresponds to the first DC-to-DC converter and further including a second output port that corresponds to the second DC-to-DC converter; and
a resistor connected to each converter of the plurality of DC-to-DC converters;
wherein the first DC-to-DC converter includes:
a load detector configured to:
detect whether the first output port that corresponds to the first DC-to-DC converter is connected to any load; and
among the plurality of output ports, determine a first number of one or more output ports that are connected to one or more loads respectively; and
a generator configured to:
if the first output port that corresponds to the first DC-to-DC converter is connected to a load, generate a first voltage as an output voltage for the first output port, the output voltage being equal to the first voltage; and
if the first output port that corresponds to the first DC-to-DC converter is not connected to any load and, among the plurality of output ports, only the second output port is connected to a load, generate a contributing current for only the second output port.

20. The multiport charging system of claim 19 wherein:
the input voltage is an AC voltage; and
the converter voltage is a DC voltage.

21. The multiport charging system of claim 19 wherein the load detector is further configured to:

if the first output port that corresponds to the first DC-to-DC converter is connected to a load, generate a load detection current with a predetermined magnitude that is larger than zero; and
if the first output port that corresponds to the first DC-to-DC converter is not connected to any load, generate the load detection current that is equal to zero in magnitude.

22. The multiport charging system of claim 21 wherein the load detector is further configured to:
receive a detection voltage from the resistor configured to receive a plurality of load detection currents from the plurality of DC-to-DC converters respectively;
wherein the plurality of load detection currents include the load detection current;
wherein:
the plurality of load detection currents correspond to a plurality of magnitudes respectively; and
each magnitude of the plurality of magnitudes is equal to zero or is equal to the predetermined magnitude that is larger than zero.

23. The multiport charging system of claim 22 wherein the load detector is further configured to, among the plurality of output ports, determine the first number of one or more output ports that are connected to one or more loads respectively based at least in part on the detection voltage.

24. The multiport charging system of claim 23 wherein the load detector is further configured to, among the plurality of output ports, other than the first output port, determine a second number of one or more output ports that are connected to one or more loads respectively.

25. The multiport charging system of claim 24 wherein, if the first output port that corresponds to the first DC-to-DC converter is connected to a load, the load detector is further configured to determine the second number to be equal to the first number subtracted by one, the second number being equal to zero or being equal to or larger than one.

26. The multiport charging system of claim 25 wherein, if the first output port that corresponds to the first DC-to-DC converter is connected to a load and the second number is equal to zero,
the first DC-to-DC converter is configured to receive one or more contributing currents from the plurality of output ports other than the first output port; and
the generator is further configured to generate a first current as part of an output current for the first output port;
wherein the output current is equal to a sum of the first current and the one or more contributing currents.

27. The multiport charging system of claim 25 wherein, if the first output port that corresponds to the first DC-to-DC converter is connected to a load and the second number is equal to or larger than one,
the generator is further configured to generate a first current as an output current for the first output port;
wherein the output current is equal to the first current.

28. The multiport charging system of claim 24 wherein, if the first output port that corresponds to the first DC-to-DC converter is not connected to any load, the load detector is further configured to determine the second number to be equal to the first number, the second number being equal to one or being equal to zero or larger than one.

29. The multiport charging system of claim 28 wherein, if the first output port that corresponds to the first DC-to-DC converter is not connected to any load and the second number is equal to one, among the plurality of output ports, only the second output port is connected to a load.

30. The multiport charging system of claim 28 wherein, if the first output port that corresponds to the first DC-to-DC converter is not connected to any load and the second number is equal to zero or larger than one, the generator is further configured not to generate any contributing current for any output port of the plurality of output ports.

31. The multiport charging system of claim 19 wherein, if the first output port that corresponds to the first DC-to-DC converter is connected to a load, the generator is further configured to:
receive the converter voltage; and
generate the first voltage based at least in part on the converter voltage.

32. The multiport charging system of claim 31 wherein, if the first output port that corresponds to the first DC-to-DC converter is connected to a load, the first DC-to-DC converter is configured to operate as a voltage-to-voltage converter.

33. The multiport charging system of claim 19 wherein, if the first output port that corresponds to the first DC-to-DC converter is not connected to any load and, among the plurality of output ports, only the second output port is connected to a load, the generator is further configured to:
receive the converter voltage; and
generate the contributing current based at least in part on the converter voltage.

34. The multiport charging system of claim 33 wherein, if the first output port that corresponds to the first DC-to-DC converter is not connected to any load and, among the plurality of output ports, only the second output port is connected to a load, the DC-to-DC converter is configured to operate as a voltage-to-current converter.

35. The multiport charging system of claim 19 wherein the plurality of output ports further include one or more additional output ports.

36. A method for a DC-to-DC converter of a multiport charging system, the multiport charging system including a plurality of output ports that correspond to a plurality of DC-to-DC converters respectively, the plurality of DC-to-DC converters including the DC-to-DC converter, the plurality of output ports including a first output port that corresponds to the DC-to-DC converter, the method comprising:
detecting whether the first output port that corresponds to the DC-to-DC converter is connected to any load;
determining, among the plurality of output ports, a first number of one or more output ports that are connected to one or more loads respectively;
generating a first voltage as an output voltage for the first output port if the first output port that corresponds to the DC-to-DC converter is connected to a load, the output voltage being equal to the first voltage; and
generating a contributing current for only a second output port if the first output port that corresponds to the DC-to-DC converter is not connected to any load and, among the plurality of output ports, only the second output port is connected to a load.

37. The method of claim 36, and further comprising:
if the first output port that corresponds to the DC-to-DC converter is connected to a load, generating a load detection current with a predetermined magnitude that is larger than zero; and
if the first output port that corresponds to the DC-to-DC converter is not connected to any load, generating the load detection current that is equal to zero in magnitude.

38. The method of claim 37, and further comprising:
receiving a detection voltage from a resistor configured to receive a plurality of load detection currents from the plurality of DC-to-DC converters respectively;
wherein the plurality of load detection currents include the load detection current;
wherein:
the plurality of load detection currents correspond to a plurality of magnitudes respectively; and
each magnitude of the plurality of magnitudes is equal to zero or is equal to the predetermined magnitude that is larger than zero.

39. The method of claim 38 wherein the determining, among the plurality of output ports, a first number of one or more output ports that are connected to one or more loads respectively comprises:
determining, among the plurality of output ports, the first number of one or more output ports that are connected to one or more loads respectively based at least in part on the detection voltage.

40. The method of claim 39, and further comprising:
determining, among the plurality of output ports, other than the first output port, a second number of one or more output ports that are connected to one or more loads respectively.

41. The method of claim 40 wherein the determining, among the plurality of output ports, other than the first output port, a second number of one or more output ports that are connected to one or more loads respectively comprises:
if the first output port that corresponds to the DC-to-DC converter is connected to a load, determining the second number to be equal to the first number subtracted by one, the second number being equal to zero or being equal to or larger than one.

42. The method of claim 41, and further comprising:
if the first output port that corresponds to the DC-to-DC converter is connected to a load and the second number is equal to zero,
receiving one or more contributing currents from the plurality of output ports other than the first output port; and
generating a first current as part of an output current for the first output port;
wherein the output current is equal to a sum of the first current and the one or more contributing currents.

43. The method of claim 41, and further comprising:
if the first output port that corresponds to the DC-to-DC converter is connected to a load and the second number is equal to or larger than one,
the generator is further configured to generate a first current as an output current for the first output port;
wherein the output current is equal to the first current.

44. The method of claim 40 wherein the determining, among the plurality of output ports, other than the first output port, a second number of one or more output ports that are connected to one or more loads respectively comprises:
if the first output port that corresponds to the DC-to-DC converter is not connected to any load, determining the second number to be equal to the first number, the second number being equal to one or being equal to zero or larger than one.

45. The method of claim 44 wherein, if the first output port that corresponds to the DC-to-DC converter is not connected to any load and the second number is equal to one, among the plurality of output ports, only the second output port is connected to a load.

46. The method of claim 36 wherein the generating a first voltage as an output voltage for the first output port if the first output port that corresponds to the DC-to-DC converter is connected to a load comprises:
if the first output port that corresponds to the DC-to-DC converter is connected to a load,
receiving a second voltage; and
generating the first voltage based at least in part on the second voltage.

47. The method of claim 36 wherein the generating a contributing current for only a second output port if the first output port that corresponds to the DC-to-DC converter is not connected to any load and, among the plurality of output ports, only the second output port is connected to a load comprises:
if the first output port that corresponds to the DC-to-DC converter is not connected to any load and, among the plurality of output ports, only the second output port is connected to a load,
receiving a second voltage; and
generating the contributing current based at least in part on the second voltage.

48. A method for a multiport charging system, the method comprising:
receiving an input voltage;
generating a converter voltage based at least in part on the input voltage;
receiving the converter voltage by a plurality of DC-to-DC converters including a first DC-to-DC converter and a second DC-to-DC converter, the plurality of DC-to-DC converters corresponding to a plurality of output ports respectively, the plurality of output ports including a first output port that corresponds to the first DC-to-DC converter and further including a second output port that corresponds to the second DC-to-DC converter;
detecting whether the first output port that corresponds to the first DC-to-DC converter is connected to any load;
determining, among the plurality of output ports, a first number of one or more output ports that are connected to one or more loads respectively;
generating a first voltage as an output voltage for the first output port if the first output port that corresponds to the first DC-to-DC converter is connected to a load, the output voltage being equal to the first voltage; and
generating a contributing current for only the second output port if the first output port that corresponds to the DC-to-DC converter is not connected to any load and, among the plurality of output ports, only the second output port is connected to a load.

49. The method of claim 48 wherein:
the input voltage is an AC voltage; and
the converter voltage is a DC voltage.

50. The method of claim 48 wherein the first number is equal to zero.

51. The method of claim 48 wherein the first number is equal to one.

52. The method of claim 48 wherein the first number is larger than one.

* * * * *